US012069625B2

(12) United States Patent
Zhang et al.

(10) Patent No.: US 12,069,625 B2
(45) Date of Patent: Aug. 20, 2024

(54) PREAMBLE TRANSMISSION IN SIDELINK COMMUNICATIONS USING SHARED RADIO FREQUENCY SPECTRUM

(71) Applicant: QUALCOMM Incorporated, San Diego, CA (US)

(72) Inventors: Xiaoxia Zhang, San Diego, CA (US); Jing Sun, San Diego, CA (US); Arthur Gubeskys, San Diego, CA (US); Shailesh Patil, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 17/399,819

(22) Filed: Aug. 11, 2021

(65) Prior Publication Data

US 2022/0086830 A1 Mar. 17, 2022

Related U.S. Application Data

(60) Provisional application No. 63/077,478, filed on Sep. 11, 2020.

(51) Int. Cl.
*H04W 72/04* (2023.01)
*H04W 16/14* (2009.01)
*H04W 72/0446* (2023.01)

(52) U.S. Cl.
CPC ....... *H04W 72/0446* (2013.01); *H04W 16/14* (2013.01)

(58) Field of Classification Search
CPC ............. H04W 72/1215; H04W 16/14; H04W 72/0446; H04W 74/0816; H04W 76/14; H04L 27/26025; H04L 27/2607; H04L 27/261; H04L 27/2614; H04L 5/0053
See application file for complete search history.

(56) References Cited

U.S. PATENT DOCUMENTS

| 2017/0111931 A1* | 4/2017 | Damnjanovic ... H04W 74/0858 |
| 2019/0053269 A1* | 2/2019 | Lei ......................... H04W 28/26 |
| 2020/0008026 A1* | 1/2020 | Martinez ................. H04W 4/12 |
| 2022/0295558 A1* | 9/2022 | Lei .......................... H04L 5/001 |

* cited by examiner

*Primary Examiner* — Mansour Oveissi
*Assistant Examiner* — David M Oveissi
(74) *Attorney, Agent, or Firm* — Holland & Hart LLP/Qualcomm Incorporated

(57) ABSTRACT

Methods, systems, and devices for wireless communications are described in which a user equipment (UE) using a first radio access technology (RAT) may transmit a channel reservation preamble of a second RAT (e.g., a Wi-Fi preamble) that provides an indication to devices of the second RAT that the UE has obtained a shared channel for a channel occupancy time (COT). The UE may determine a start time of the channel reservation preamble relative to a start time of a first symbol of a transmission slot based at least in part on a time duration of the first symbol. The channel reservation preamble may reserve multiple slots or a single slot. A UE transmitting on two or more sub-channels may transmit a preamble on one of the sub-channels or on each of the sub-channels.

30 Claims, 18 Drawing Sheets

PREAMBLE TRANSMISSION IN SIDELINK COMMUNICATIONS USING SHARED RADIO FREQUENCY SPECTRUM

CROSS REFERENCE

The present Application for Patent claims the benefit of U.S. Provisional Patent Application No. 63/077,478 by ZHANG et al., entitled "PREAMBLE TRANSMISSION IN SIDELINK COMMUNICATIONS USING SHARED RADIO FREQUENCY SPECTRUM," filed Sep. 11, 2020, assigned to the assignee hereof, and expressly incorporated by reference herein.

FIELD OF TECHNOLOGY

The following relates to wireless communications, including preamble transmission in sidelink communications using shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support preamble transmission in sidelink communications using shared radio frequency spectrum. In various aspects, a user equipment (UE) using a first radio access technology (RAT) (e.g., a NR UE) may transmit a channel reservation preamble of a second RAT (e.g., a Wi-Fi preamble). The channel reservation preamble provides an indication, to devices that monitor for the preamble of the second RAT, that the UE has obtained a shared channel for a channel occupancy time (COT) associated with the preamble. In some aspects, the first RAT may have synchronized transmission slots that include a number of transmission symbols, and a duration of the channel reservation preamble may span more than one symbol. In some cases, the UE may determine a start time of the channel reservation preamble relative to a start time of a first symbol of a slot.

In some cases, the channel reservation preamble may start prior to the first symbol. In some cases, the channel reservation preamble may have a start time that corresponds with a start of the first symbol and extends into a second symbol of the slot, and the UE may rate-match data communications starting at the second symbol around the channel reservation preamble. In some cases, a preamble that is transmitted in a first slot of a transmission grid may reserve multiple slots, and a preamble that is transmitted in a subsequent slot of the transmission grid may reserve a single slot. Additionally or alternatively, a UE transmitting on two or more sub-channels may transmit a preamble on one of the sub-channels or on each of the sub-channels.

A method of wireless communication at a UE is described. The method may include identifying a first symbol of a sidelink communications frame of a first radio access technology that uses a shared radio frequency spectrum band for sidelink communications between UEs, determining a start time for a channel reservation preamble associated with a second radio access technology relative to the first symbol, where the channel reservation preamble spans a preamble duration that is longer than a symbol duration of the first symbol of the sidelink communications frame, and transmitting the channel reservation preamble based on the determined start time.

An apparatus for wireless communication at a UE is described. The apparatus may include a processor, memory coupled with the processor, and instructions stored in the memory. The instructions may be executable by the processor to cause the apparatus to identify a first symbol of a sidelink communications frame of a first radio access technology that uses a shared radio frequency spectrum band for sidelink communications between UEs, determine a start time for a channel reservation preamble associated with a second radio access technology relative to the first symbol, where the channel reservation preamble spans a preamble duration that is longer than a symbol duration of the first symbol of the sidelink communications frame, and transmit the channel reservation preamble based on the determined start time.

Another apparatus for wireless communication at a UE is described. The apparatus may include means for identifying a first symbol of a sidelink communications frame of a first radio access technology that uses a shared radio frequency spectrum band for sidelink communications between UEs, determining a start time for a channel reservation preamble associated with a second radio access technology relative to the first symbol, where the channel reservation preamble spans a preamble duration that is longer than a symbol duration of the first symbol of the sidelink communications frame, and transmitting the channel reservation preamble based on the determined start time.

A non-transitory computer-readable medium storing code for wireless communication at a UE is described. The code may include instructions executable by a processor to identify a first symbol of a sidelink communications frame of a first radio access technology that uses a shared radio frequency spectrum band for sidelink communications between UEs, determine a start time for a channel reservation preamble associated with a second radio access technology relative to the first symbol, where the channel reservation preamble spans a preamble duration that is longer than a symbol duration of the first symbol of the sidelink communications frame, and transmit the channel reservation preamble based on the determined start time.

In some examples of the method, apparatuses, and non-transitory computer-readable medium described herein, the determining further may include operations, features, means, or instructions for determining the symbol duration of the first symbol from a set of available symbol durations of the first radio access technology, and determining the start time for the channel reservation preamble relative to the sidelink communications frame based on the symbol duration of the first symbol. In some examples of the method, apparatuses, and non-transitory computer-readable medium described herein, the first radio access technology may be a 5G new radio (NR) radio access technology and the second radio access technology may be a Wi-Fi radio access technology based on IEEE 802.11 protocols or a dedicated short range communications (DSRC) radio access technology.

In some examples of the method, apparatuses, and non-transitory computer-readable medium described herein, the first symbol of the sidelink communications frame may be an initial symbol of the sidelink communications frame and may be used for automatic gain control (AGC) at a receiving UE, and a second symbol of the sidelink communications frame subsequent to the first symbol may be used for sidelink data transmission, and where the start time for the channel reservation preamble is prior to the first symbol such that the preamble duration ends prior to the second symbol of the sidelink communications frame. In some examples of the method, apparatuses, and non-transitory computer-readable medium described herein, a gap symbol may be configured prior to the first symbol of the sidelink communications frame and provides for switching of receiver hardware at the UE between transmission and reception configurations, and where the start time for the channel reservation preamble is during the gap symbol.

In some examples of the method, apparatuses, and non-transitory computer-readable medium described herein, the first symbol of the sidelink communications frame includes data transmission resources, and where the channel reservation preamble punctures the data transmission resources of the first symbol. In some examples of the method, apparatuses, and non-transitory computer-readable medium described herein, the preamble duration spans more than two symbol durations of the first radio access technology, and the start time for the channel reservation preamble is more than one symbol prior to the first symbol of the sidelink communications frame. In some examples of the method, apparatuses, and non-transitory computer-readable medium described herein, the start time for the channel reservation preamble punctures a data transmission of a prior sidelink communications frame that is prior to the first symbol.

Some examples of the method, apparatuses, and non-transitory computer-readable medium described herein may further include operations, features, means, or instructions for receiving a sidelink configuration that provides for an early termination of sidelink communications in sidelink communications frames that occur prior to the channel reservation preamble. Some examples of the method, apparatuses, and non-transitory computer-readable medium described herein may further include operations, features, means, or instructions for receiving a sidelink configuration that provides for fewer symbols for sidelink data transmissions in slots where the channel reservation preamble is to be transmitted. In some examples of the method, apparatuses, and non-transitory computer-readable medium described herein, the preamble duration spans an initial two symbols of the sidelink communications frame.

In some examples of the method, apparatuses, and non-transitory computer-readable medium described herein, sidelink communications within the sidelink communications frame may be rate-matched around the channel reservation preamble. In some examples of the method, apparatuses, and non-transitory computer-readable medium described herein, the start time for the channel reservation preamble may be prior to the first symbol of the sidelink communications frame. In some examples of the method, apparatuses, and non-transitory computer-readable medium described herein, the channel reservation preamble includes an indication of a number of symbols of the sidelink communications frame are spanned by the channel reservation preamble.

In some examples of the method, apparatuses, and non-transitory computer-readable medium described herein, a set of UEs transmit and receive sidelink communications, and where a subset of the set of UEs is configured to transmit the channel reservation preamble. In some examples of the method, apparatuses, and non-transitory computer-readable medium described herein, the channel reservation preamble further includes a channel occupancy time that is greater than one slot of the first radio access technology. In some examples of the method, apparatuses, and non-transitory computer-readable medium described herein, the channel occupancy time may be shared by all of the UEs of the set of UEs.

In some examples of the method, apparatuses, and non-transitory computer-readable medium described herein, the channel occupancy time ends at a predetermined location of a resource pool configured for sidelink communications. In some examples of the method, apparatuses, and non-transitory computer-readable medium described herein, the first symbol of the sidelink communications frame may be an automatic gain control (AGC) symbol, and where a transmission power associated with the channel reservation preamble is selected to be aligned with a subsequent sidelink transmission power.

A method of wireless communications at a UE is described. The method may include identifying a set of sub-bands of a shared radio frequency spectrum band for sidelink communications between UEs using a first radio access technology, determining, for each sub-band of the set of sub-bands, a start time for a channel reservation preamble associated with a second radio access technology, where the start time for each sub-band is determined relative to a boundary of a first symbol, and where different sub-bands have different start times, and transmitting the channel reservation preamble on one or more of the set of sub-bands based on the determined start time.

An apparatus for wireless communications at a UE is described. The apparatus may include a processor, memory coupled with the processor, and instructions stored in the memory. The instructions may be executable by the processor to cause the apparatus to identify a set of sub-bands of a shared radio frequency spectrum band for sidelink communications between UEs using a first radio access technology, determine, for each sub-band of the set of sub-bands, a start time for a channel reservation preamble associated with a second radio access technology, where the start time for each sub-band is determined relative to a boundary of a first symbol, and where different sub-bands have different start times, and transmit the channel reservation preamble on one or more of the set of sub-bands based on the determined start time.

Another apparatus for wireless communications at a UE is described. The apparatus may include means for identifying a set of sub-bands of a shared radio frequency spectrum band for sidelink communications between UEs using a first radio access technology, determining, for each sub-band of the set of sub-bands, a start time for a channel reservation preamble associated with a second radio access technology, where the start time for each sub-band is determined relative to a boundary of a first symbol, and where different sub-bands have different start times, and transmitting the channel reservation preamble on one or more of the set of sub-bands based on the determined start time.

A non-transitory computer-readable medium storing code for wireless communications at a UE is described. The code may include instructions executable by a processor to identify a set of sub-bands of a shared radio frequency spectrum band for sidelink communications between UEs using a first radio access technology, determine, for each sub-band of the set of sub-bands, a start time for a channel reservation preamble associated with a second radio access technology, where the start time for each sub-band is determined relative to a boundary of a first symbol, and where different sub-bands have different start times, and transmit the channel reservation preamble on one or more of the set of sub-bands based on the determined start time.

In some examples of the method, apparatuses, and non-transitory computer-readable medium described herein, a first instance of the channel reservation preamble may be transmitted on a first sub-band starting at a first start time for the channel reservation preamble, and a second instance of the channel reservation preamble may be transmitted on a second sub-band starting at a time offset relative to the first start time. In some examples of the method, apparatuses, and non-transitory computer-readable medium described herein, the time offset of the second sub-band is common across a set of UEs that transmit and receive sidelink communications.

In some examples of the method, apparatuses, and non-transitory computer-readable medium described herein, the channel reservation preamble is transmitted on one sub-band of the set of sub-bands. In some examples of the method, apparatuses, and non-transitory computer-readable medium described herein, the one sub-band of the set of sub-bands used to transmit the channel reservation preamble is selected randomly from the set of sub-bands. In some examples of the method, apparatuses, and non-transitory computer-readable medium described herein, one or more other UEs transmits the channel reservation preamble on one or more other sub-bands of the set of sub-bands.

DETAILED DESCRIPTION

Figure 1:
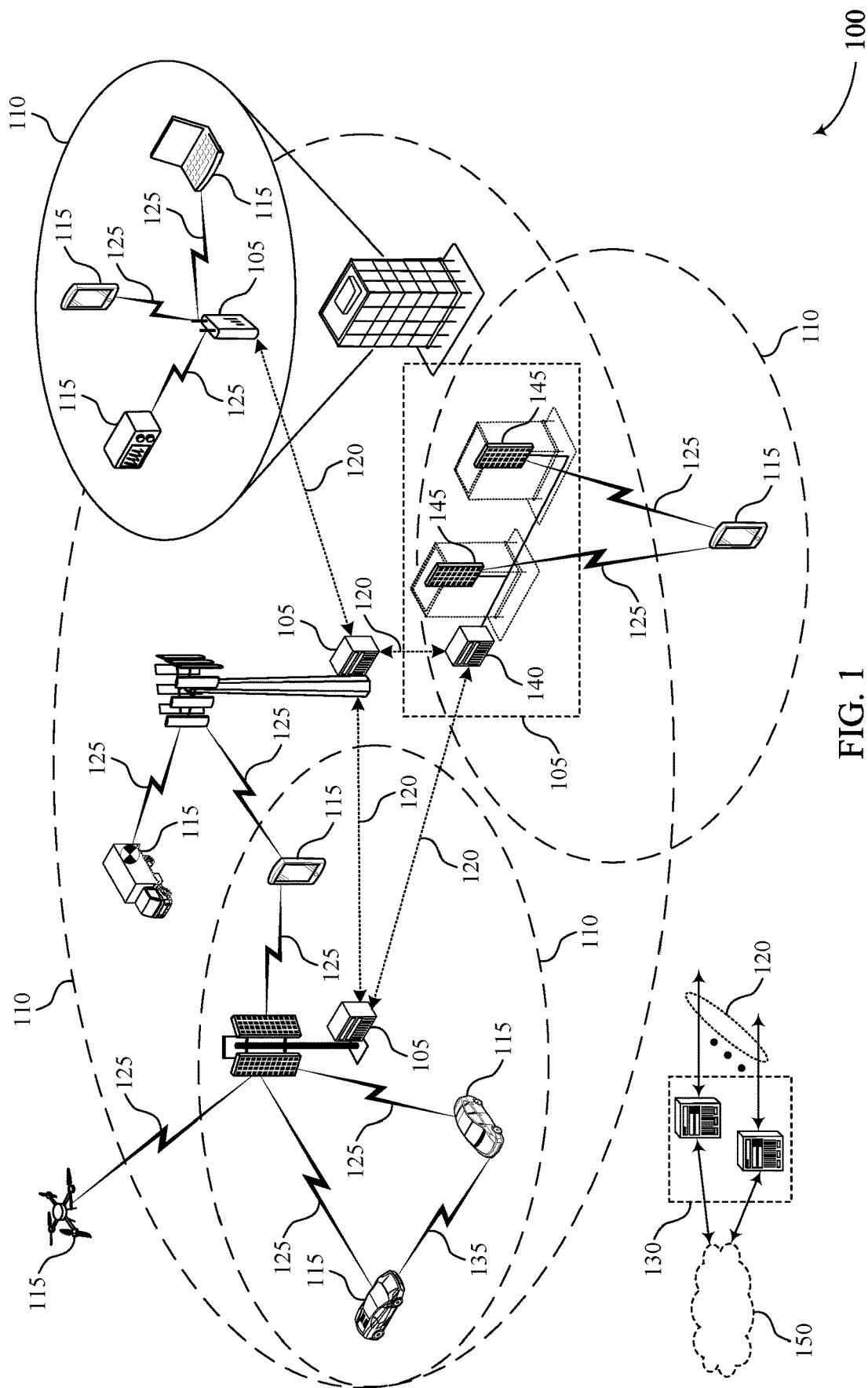
FIG. 1 illustrates an example of a system for wireless communications that supports preamble transmission in sidelink communications using shared radio frequency spectrum in accordance with aspects of the present disclosure.

Some wireless communications systems may support both access links and sidelinks. An access link is a communication link between a user equipment (UE) and a base station. In some examples, an access link may be referred to as a Uu interface. Specifically, the Uu interface may refer to an over-the-air interface for downlink transmissions, uplink transmissions, or both. A sidelink is a communication link between similar devices and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples) between multiple base stations (e.g., in an integrated access and backhaul (IAB) deployment), or between other types of wireless communications devices. It is noted that while various examples provided herein are discussed for UE sidelink devices, techniques discussed herein may be used for any type of wireless devices that use shared radio frequency channels in which multiple radio access technologies (RATs) may share a channel. For example, a sidelink may support one or more of D2D communications, V2X or V2V communications, message relaying, discovery signaling, beacon signaling, or other signals transmitted over-the-air from one wireless device to one or more other similar wireless devices.

In some cases, a base station may configure a set of resources for use in sidelink communications between UEs. For example, the base station may configure frame and slot timing, which may be used for UEs in sidelink communications. For example, a slot may contain 14 symbols, in which an initial symbol of the slot may be used for automatic gain control (AGC) at a receiving device, and a last symbol of the slot may be a gap symbol to allow for switching of hardware at the UE between transmission and reception configurations. Further, in some cases the base station may configure a sub-carrier spacing (SCS) that is to be used for communications. For example, UEs may use a 15 kHz SCS, a 30 kHz SCS, a 60 kHz SCS, or some other SCS. The particular SCS that is configured for communications may determine the symbol duration and a slot duration (e.g., a symbol duration for 15 kHz SCS may be half of a symbol duration for 30 kHz SCS).

In some cases, sidelink UEs may use shared or unlicensed radio frequency spectrum in which devices that are to access a channel perform a contention-based channel access procedure that provides fair channel access to the unlicensed or shared radio frequency spectrum. For example, a UE may perform a listen before talk (LBT) procedure (e.g., a clear channel assessment (CCA)) and determine whether signals from another device are detected on a channel or sub-channel. In the event that other signals are not detected that are indicative of another device using the channel, the UE may determine that the channel is available and transmit a reservation signal to indicate to other UEs that the channel is reserved for a channel occupancy time (COT). In some cases, the reservation signal may be a channel reservation preamble of a different radio access technology (RAT) than the UE is using. For example, the UE may operate using a NR RAT, and may transmit a Wi-Fi channel reservation preamble of a Wi-Fi RAT. Other devices that use the shared radio frequency spectrum may monitor for such a channel reservation preamble (e.g., other Wi-Fi devices or dedicated short range communications (DSRC) devices) and adjust one or more backoff parameters in the event that a channel reservation preamble is detected.

In some cases, such a channel reservation preamble may have a preamble duration that is defined by the other RAT. In cases where a relatively high SCS is configured for sidelink communications, such a preamble duration may span more than one symbol of a sidelink communications slot that is used by sidelink UEs for communications. As discussed herein, in some cases, a timing of the channel reservation preamble may be determined relative to a start time of a first symbol of a slot (e.g., an initial symbol of the slot). In some cases, the channel reservation preamble may start prior to the first symbol, such as in a gap symbol that is configured as a last symbol of a prior slot. In such cases, the channel reservation preamble may start sufficiently after a start time of the last symbol to still allow for switching of components between transmission and reception states. In some cases, the reservation symbol may span two or more slot durations, and the UE may start the channel reservation preamble in a symbol of a prior slot before the first symbol, and extend the transmission of the preamble into a subsequent symbol after the first symbol. In such cases, communications starting with the subsequent symbol may be rate-matched around the channel reservation preamble. In other cases, the sidelink communications may be configured with additional gap symbols in cases where the SCS is configured such that the channel reservation preamble spans two or more symbols.

In some cases, the channel reservation preamble may indicate a channel reservation for a particular COT. In other cases, the channel reservation preamble may include an indication of a duration of the COT. In further cases, a preamble transmission grid may be configured that spans multiple slots. In such cases, a channel reservation preamble transmitted in a first slot of the preamble transmission grid may reserve multiple slots (e.g., N slots of a preamble transmission grid with N slots), and channel reservation preambles transmitted in subsequent slots of the preamble transmission grid may reserve a single slot.

Additionally or alternatively, sidelink UEs may communicate using two or more sub-bands to provide for wideband communications (e.g., UEs may use multiple 20 MHz sub-bands). In such cases, a UE may transmit a channel reservation preamble on one or more of the sub-bands. In some cases, the UE may transmit the channel reservation preamble on each configured sub-band, in which a starting time of a first sub-band is advanced relative to a starting time of a second sub-band. Such techniques may provide time domain dithering to avoid a relatively large peak to average power ratio (PAPR). In other cases, the channel reservation may be transmitted using only one sub-band (e.g., based on random selection or a configured sub-band). In further cases, a preamble transmission grid may be configured for multiple slots and multiple sub-bands, in which one UE may transmit a channel reservation preamble at a given time on a given sub-band, and one or more other UEs may transmit a channel reservation preamble at a different time on a different sub-band.

Various aspects of the subject matter described herein may be implemented to realize one or more of the following potential advantages. The techniques employed by the described base stations and UEs may provide benefits and enhancements to the operation of a wireless communications system. For example, operations performed by the UEs may provide improvements to reliability and efficiency in communications using shared radio frequency spectrum with sidelink UEs and other devices that may contend for channel access to the shared radio frequency spectrum. Such improvements may enhance efficiency of wireless communications at a UE by allowing for reliable transmission of channel reservation preambles, which may act to reserve a channel based on detection by other devices that may then set access backoff parameters based on a COT associated with the preamble. The described techniques may thus include features for improvements to reliability in communications, reduced power consumption through efficient backoff or channel selection, enhanced communications efficiency for sidelink UEs and other devices that use shared radio frequency spectrum through reduced interference, among other benefits.

Aspects of the disclosure are initially described in the context of wireless communications systems. Various examples of channel reservation preamble techniques are then discussed for several examples of slot and channel formats. Aspects of the disclosure are further illustrated by and described with reference to apparatus diagrams, system diagrams, and flowcharts that relate to preamble transmission in sidelink communications using shared radio frequency spectrum.

FIG. 1 illustrates an example of a wireless communications system 100 that supports preamble transmission in sidelink communications using shared radio frequency spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 using a first RAT (e.g., a NR UE) may transmit a channel reservation preamble of a second RAT (e.g., a Wi-Fi preamble) that provides an indication to devices that monitor for the preamble of the second RAT that the UE 115 has obtained a shared channel for a COT associated with the preamble. In some aspects, the first RAT may be a NR RAT, and a duration of the channel reservation preamble may span more than one OFDM symbol of a transmission slot. In some cases, whether the duration of the channel reservation preamble spans more than one symbol may depend upon a SCS used by the UE 115 for communications, and the UE 115 may determine a start time of the channel reservation preamble based at least in part on a duration of a first symbol of a slot that is to include the channel reservation preamble. In some cases, the channel reservation preamble may start prior to the first symbol. In some cases, the channel reservation preamble may have a start time that corresponds with a start of the first symbol and extend into a second symbol, and the UE 115 may rate-match data communications starting at the second symbol around the channel reservation preamble. In some cases, a preamble that is transmitted in a first slot of a transmission grid may reserve multiple slots, and a preamble that is transmitted in a subsequent slot of the transmission grid may reserve a single slot. Additionally or alternatively, a UE 115 transmitting on two or more sub-channels may transmit a preamble on one of the sub-channels or on multiple sub-channels.

Figure 2:
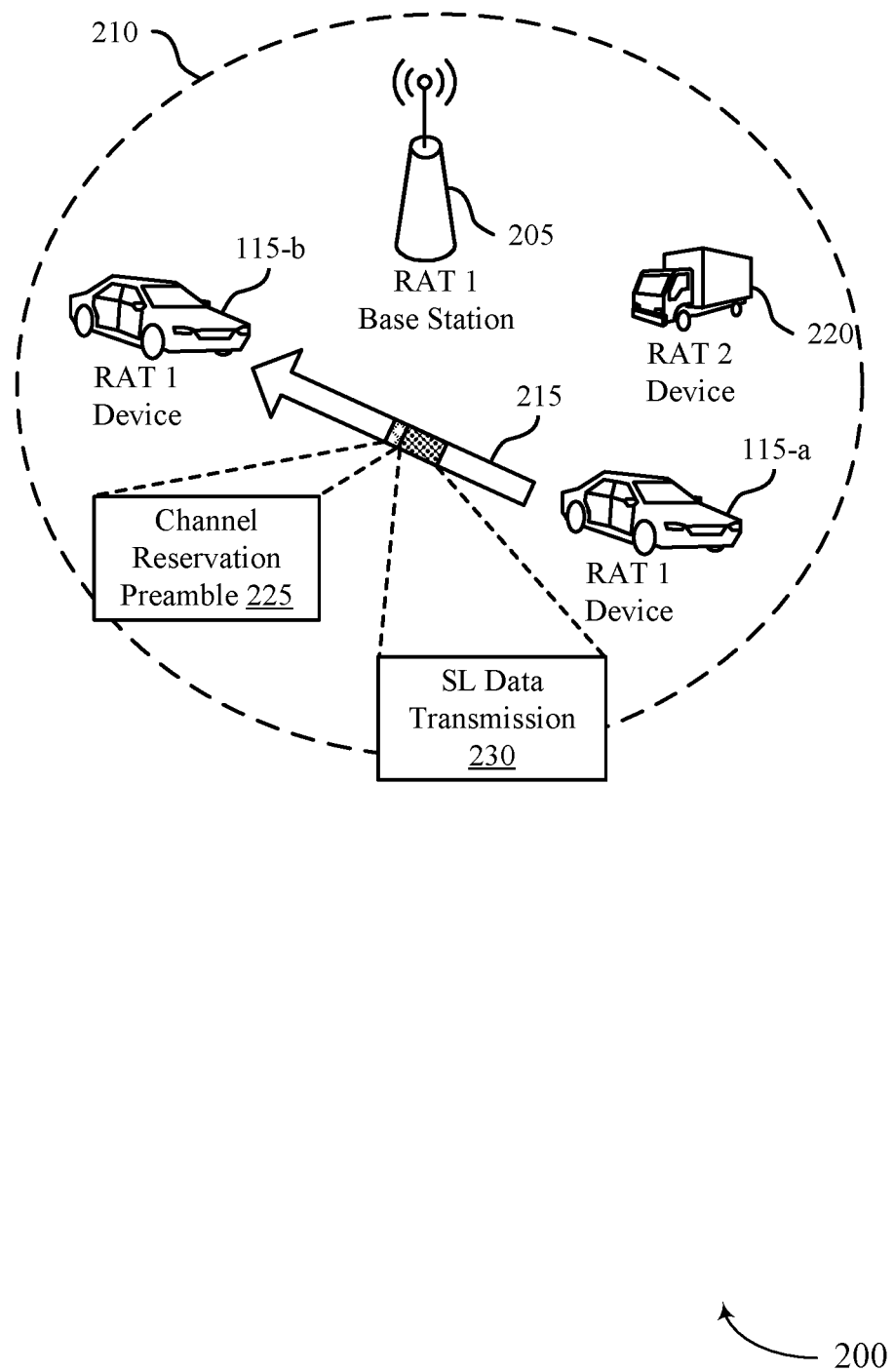
FIG. 2 illustrates an example of a portion of a wireless communications system that supports preamble transmission in sidelink communications using shared radio frequency spectrum in accordance with aspects of the present disclosure.

FIG. 2 illustrates an example of a wireless communications system 200 that supports preamble transmission in sidelink communications using shared radio frequency spectrum in accordance with aspects of the present disclosure. In some examples, wireless communications system 200 may implement aspects of wireless communications system 100. In this example, a base station 205 may configure multiple UEs 115 within a coverage area 210, including a first UE 115-a and a second UE 115-b, for sidelink communications using a first RAT (e.g., a PC5 link that uses NR communications). The sidelink communications may use shared radio frequency spectrum, in which a contention-based channel access procedure is used to obtain the shared radio frequency spectrum for a COT.

In this example, the first UE 115-a may perform the contention-based channel access procedure (e.g., a LBT procedure) and obtain channel access for sidelink communications 215 with one or more other UEs including the second UE 115-b for a COT. In some aspects of the disclosure, in order to provide an indication of the COT to one or more other devices, such as a RAT-2 device 220, that may communicate using a second RAT (e.g., Wi-Fi or other RAT using a DSRC band) that accesses the shared radio frequency spectrum, the first UE 115-a may transmit a channel reservation preamble 225. In some cases, the channel reservation preamble 225 may be a preamble of the second RAT that is monitored for by the RAT-2 device 220, and may provide a COT indication (e.g., based on an indication provided in the channel reservation preamble 225 or a configured COT associated with a detection of a particular preamble). The RAT-2 device 220 may, upon detection of the channel reservation preamble 225, set a backoff counter based on the COT indication of the channel reservation signal. The first UE 115-a may transmit sidelink data transmission 230 using one or more sub-channels of the shared radio frequency spectrum to the second UE 115-b.

Such techniques may allow for efficient communications in which NR V2X communication is introduced on unlicensed spectrum, or NR V2X and DSRC may coexist on a same Intelligent Transportation Systems (ITS) spectrum. Transmission of the channel reservation preamble 225 may help to alleviate the medium collision and allow for devices to set appropriate backoff timers. As discussed herein, in some cases the first RAT (e.g., a NR RAT) may support multiple numerologies (e.g., 15 KHz/30 KHz/60 KHz SCS), and thus the channel reservation preamble 225 (e.g., Wi-Fi preamble) may span different numbers of symbols (e.g., due to the channel reservation preamble 225 duration being defined according to the second RAT). In some cases, communications slots for sidelink communications 215 may include an AGC symbol that may be used to transmit the channel reservation preamble 225. In cases where a 15 kHz SCS is used for sidelink communications 215, the AGC symbol may have a sufficient duration to accommodate the channel reservation preamble 225. However, in some cases, different numerologies such as 30 kHz or 60 kHz SCS may result in a symbol duration in which the AGC symbol may not be able to accommodate the channel reservation preamble 225. For example, the channel reservation preamble 225 may use a Wi-Fi preamble having a duration of 40 μs, and sidelink communications 215 may have symbol durations of 72 μs for 15 kHz SCS, 36 μs for 30 kHz SCS, and 18 μs for 60 kHz SCS, thus resulting in the AGC symbol being unable to accommodate the channel reservation preamble 225 for the 30 kHz and 60 kHz SCS configurations. In accordance with various techniques as discussed herein, sidelink UEs 115 may determine a start time for the channel reservation preamble 225 relative to a first symbol of a slot based at least in part on a SCS configuration.

Figure 3:
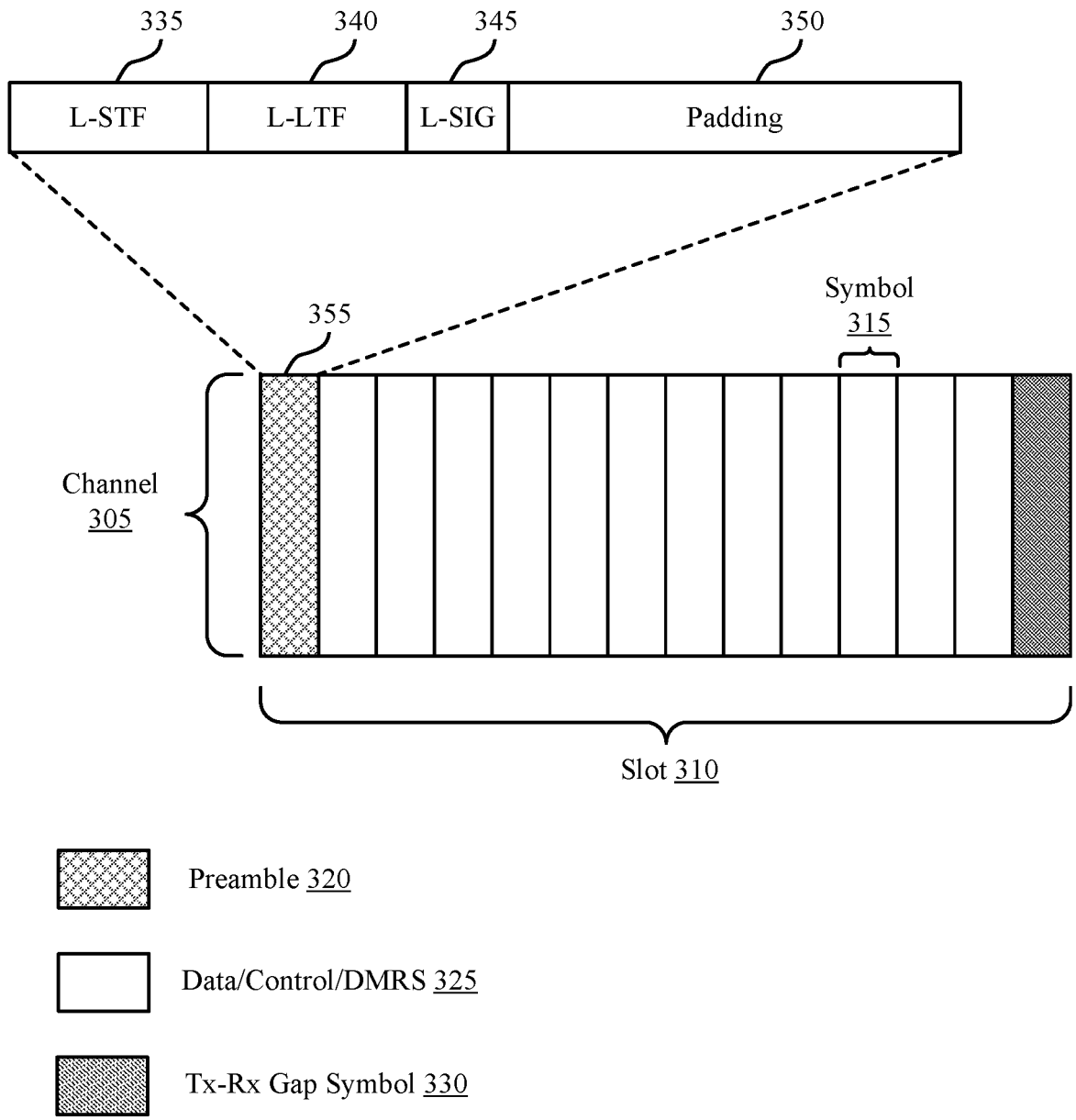
FIG. 3 illustrates an example of a slot structure that supports preamble transmission in sidelink communications using shared radio frequency spectrum in accordance with aspects of the present disclosure.

FIG. 3 illustrates an example of a slot structure 300 that supports preamble transmission in sidelink communications using shared radio frequency spectrum in accordance with aspects of the present disclosure. In some examples, slot structure 300 may implement aspects of wireless communications system 100 or 200. In this example, a UE (e.g., a UE 115 of FIG. 1 or 2) may use a channel 305 in a shared radio frequency spectrum band for communications with one or more other UEs, base stations, or other devices. Communications by the UE may use a first RAT that uses a slot 310 having a number of OFDM symbols 315. For example, in a NR RAT, a slot 310 may have 14 symbols 315 for communications configured with a normal cyclic prefix.

In the example of FIG. 3, a 15 kHz SCS may be configured, thus providing that each symbol 315 spans 72 μs and the slot 310 spans 1.008 ms. In this example, the UE may perform a LBT procedure and gain channel access. Based on the successful LBT procedure, the UE may transmit a channel reservation preamble 320 of a second RAT. In this example, channel reservation preamble 320 may be a Wi-Fi preamble that may be monitored for by Wi-Fi devices (e.g., that may use a DSRC band), or various other devices. Such a Wi-Fi preamble may include a number of preamble fields, which may include a legacy short training field (L-STF) 335, a legacy long training field (L-LTF) 340, and a legacy signal (L-SIG) field 345. In this example, the channel reservation preamble 320 may be carried in a first symbol 355 of the slot 310, which may be used as an AGC symbol for sidelink communications (e.g., based on the preamble 320 being transmitted using a consistent power to allow for AGC at a receiving UE). In some cases, the Wi-Fi preamble may be defined in accordance with the second RAT, and may have a L-STF 335 duration of 16 μs, a L-LTF 340 duration of 16 μs, and a L-SIG 345 duration of 8 μs, thus giving a duration of 40 μs for the Wi-Fi preamble. In this example, the UE may add padding 350 to the channel reservation preamble 320 to accommodate the remaining time of the first symbol 355 and allow for AGC at the receiving UE(s). Following the AGC symbol 355, the slot 310 may include sidelink communications symbols 325 for data, control, and reference signal (e.g., DMRS) transmission, and a transmission-reception gap symbol 330. In some cases, the UE may determine the starting time for the preamble 320 based at least in part on the duration of the symbols 315. Thus, in cases such as illustrated in FIG. 3, the UE may determine that the Wi-Fi preamble may be completely accommodated within the AGC symbol 355. In other examples as discussed herein, the preamble 320 may not be able to be completely accommodated within the AGC symbol 355, and may span into one or more adjacent symbols.

Figure 4:
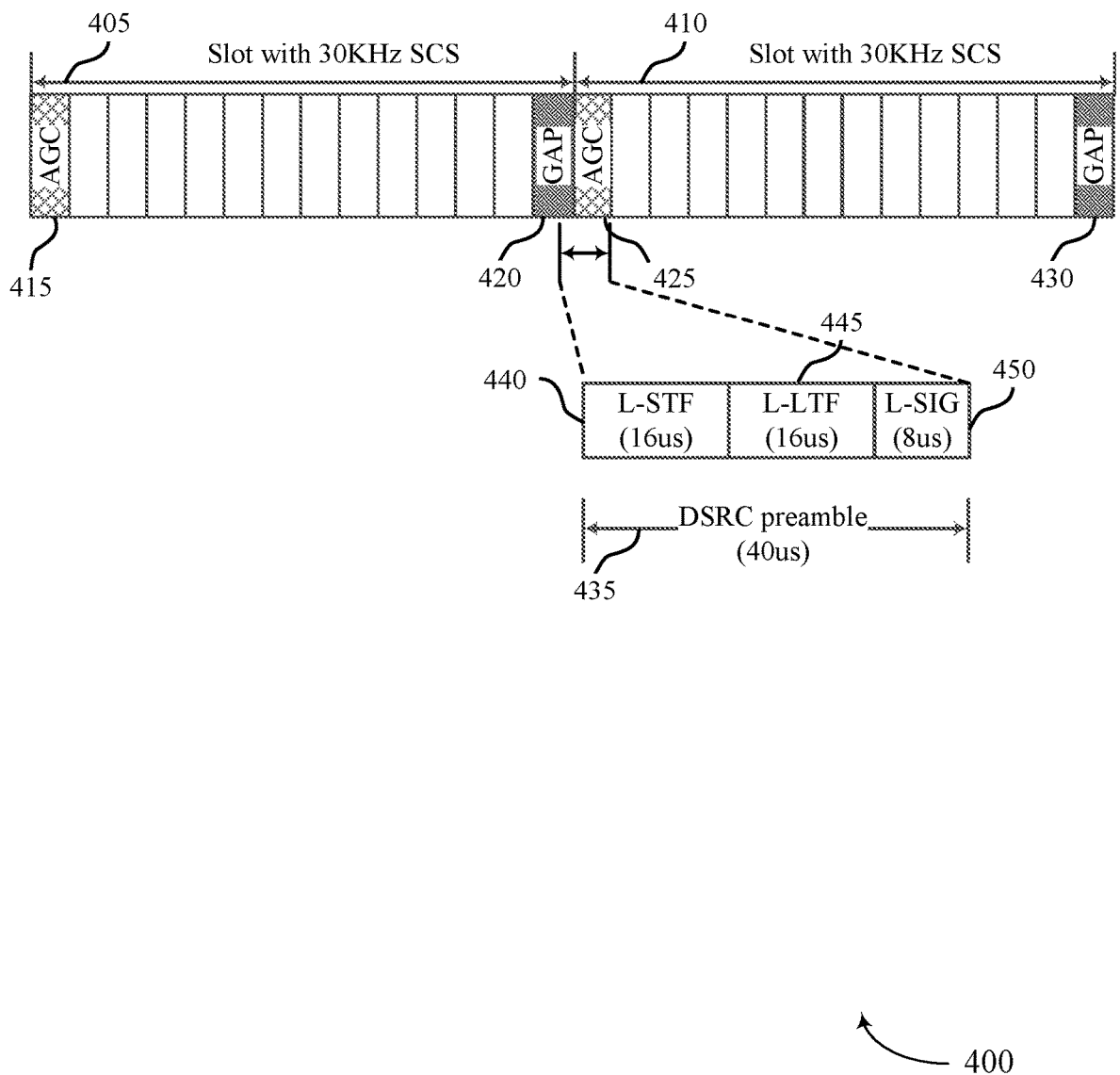
FIGS. 4 through 6 illustrate examples a preamble timings in slot structures that support preamble transmission in sidelink communications using shared radio frequency spectrum in accordance with aspects of the present disclosure.

FIG. 4 illustrates an example of a preamble timing in a slot structure 400 that supports preamble transmission in sidelink communications using shared radio frequency spectrum in accordance with aspects of the present disclosure. In some examples, preamble timing in a slot structure 400 may implement aspects of wireless communications system 100 or 200. In this example, UEs may be configured for sidelink communications using shared radio frequency spectrum, in which a SCS is configured to be 30 kHz. A first slot 405 and a second slot 410 may thus include a number of symbols that each have a 36 μs time duration. The first slot 405 may include an AGC symbol 415 as an initial symbol and a gap symbol 420 as a last symbol. Likewise, the second slot 410 may include an AGC symbol 425 and a gap symbol 430.

In this example, a transmitting UE may perform a contention-based channel access procedure and gain access to the channel for sidelink communications. The UE may transmit a channel reservation preamble 435 (e.g., a Wi-Fi preamble on a DSRC band) to indicate to other devices that the UE has reserved the channel for a COT. In this example, the channel reservation preamble 435 may be a Wi-Fi preamble that includes a L-STF 440, a L-LTF 445, and a L-SIG 450, which together span a time duration of 40 μs, which is longer than a symbol duration of AGC symbol 425. In this example, part of the gap symbol 420 may be used for transmission of the preamble 435. In this case, the remaining portion of the gap symbol 420 in the last symbol in the first slot 405 is still sufficient for transmission/reception switching of UEs, and thus transmission of the preamble 435 does not require additional resource overhead of the sidelink communications. In some cases, the AGC symbol 425 may include a sidelink synchronization signal block (SSB) as well as for AGC. In such cases, the SSB may be transmitted using a physical sidelink broadcast channel (PSBCH), and the first PSBCH may be punctured for transmission of the preamble 435.

Figure 5:
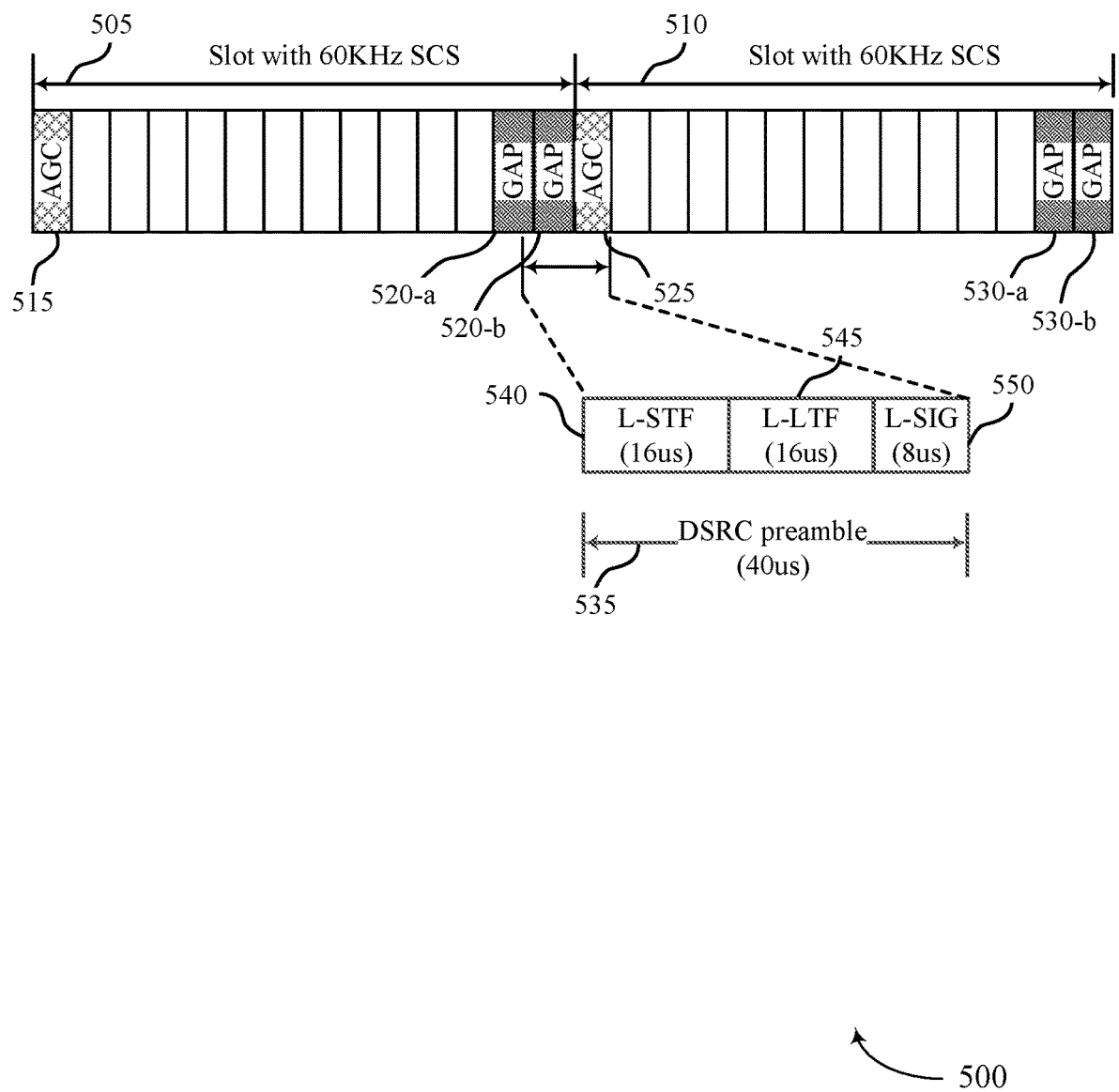

FIG. 5 illustrates an example of a preamble timing in a slot structure 500 that supports preamble transmission in sidelink communications using shared radio frequency spectrum in accordance with aspects of the present disclosure. In some examples, preamble timing in a slot structure 500 may implement aspects of wireless communications system 100 or 200. In this example, UEs may be configured for sidelink communications using shared radio frequency spectrum, in which a SCS is configured to be 60 kHz. A first slot 505 and a second slot 510 may thus include a number of symbols that each have an approximately 18 μs time duration. The first slot 505 may include an AGC symbol 515 as an initial symbol and two gap symbols 520. Likewise, the second slot 510 may include an AGC symbol 525 and two gap symbols 530.

In this example, a transmitting UE may perform a contention-based channel access procedure and gain access to the channel for sidelink communications. The UE may transmit a channel reservation preamble 535 (e.g., a Wi-Fi preamble on a DSRC band) to indicate to other devices that the UE has reserved the channel for a COT. In this example, the channel reservation preamble 535 may be a Wi-Fi preamble that includes a L-STF 540, a L-LTF 545, and a L-SIG 550, which together span a time duration of 40 μs, which is longer than the 18 μs symbol duration of AGC symbol 525. In this example, a first gap symbol 520-*a* and a second gap symbol 520-*b*, along with AGC symbol 525, may be used for transmission of the preamble 535. In this case, the remaining portion of the first gap symbol 520-*a* in the first slot 505 is sufficient for transmission/reception switching of UEs. In cases where the AGC symbol 525 may include a sidelink SSB, again the PSBCH with the SSB may be punctured for transmission of the preamble 535. In some cases, the first gap symbol 520-*a* may be inserted in the first slot 505 and may puncture communications of the first slot 505. In other cases, the sidelink communications may be configured with fewer symbols in each slot (e.g., 13 symbols) when 60 kHz SCS (or higher) is used. In other cases, such as illustrated in the example of FIG. 6, the AGC symbol may be moved to a second symbol of a slot and the preamble may be transmitted using a last symbol or a fraction of a last symbol of the prior slot and the first two symbols of the slot with the preamble.

Figure 6:
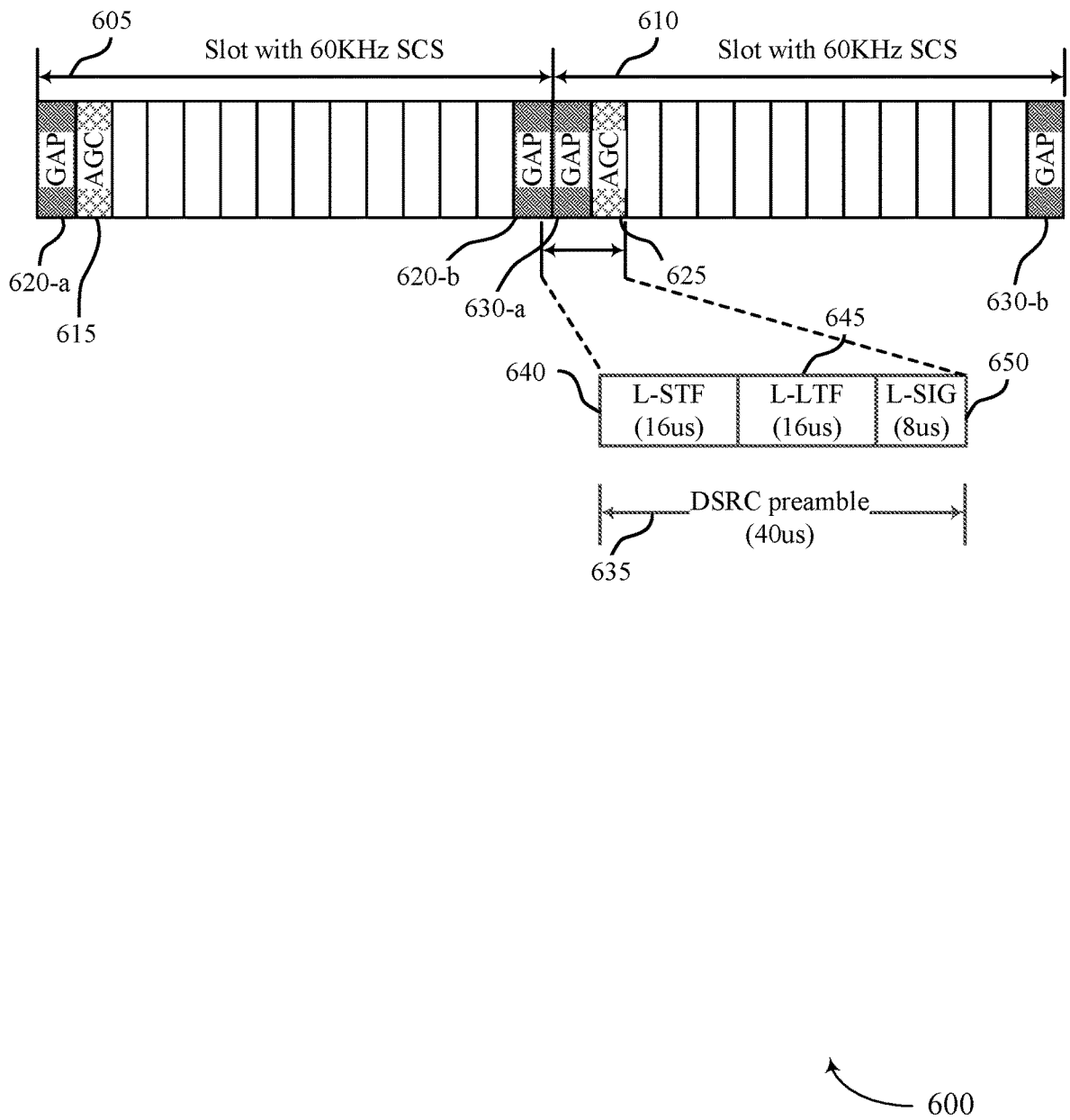

FIG. 6 illustrates an example of a preamble timing in a slot structure 600 that supports preamble transmission in sidelink communications using shared radio frequency spectrum in accordance with aspects of the present disclosure. In some examples, preamble timing in a slot structure 600 may implement aspects of wireless communications system 100 or 200. In this example, UEs may be configured for sidelink communications using shared radio frequency spectrum, in which a SCS is configured to be 60 kHz. A first slot 605 and a second slot 610 may thus include a number of symbols that each have a 18 μs time duration. The first slot 605 may include an AGC symbol 615 as an initial symbol and two gap symbols 620 configured as an initial gap symbol 620-*a* and a last gap symbol 620-*b* of the first slot 605. Likewise, the second slot 610 may include an AGC symbol 625 and two gap symbols 630 configured as an initial gap symbol 630-*a* and a last gap symbol 630-*b* of the second slot 610.

In this example, a transmitting UE may perform a contention-based channel access procedure and gain access to the channel for sidelink communications. The UE may transmit a channel reservation preamble 635 (e.g., a Wi-Fi preamble on a DSRC band) to indicate to other devices that the UE has reserved the channel for a COT. In this example, the channel reservation preamble 635 may be a Wi-Fi preamble that includes a L-STF 640, a L-LTF 645, and a L-SIG 650, which together span a time duration of 40 μs, which is longer than the 18 μs symbol duration of AGC symbol 625. In this example, the sidelink communications may start late in the second slot 610, and the preamble 635 may be transmitted in the last gap symbol 620-*b* of the first slot 605, and the initial gap symbol 630-*a* and AGC symbol 625 of the second slot 610. In some cases, the location of the AGC symbol 625 as the second symbol in the second slot 610 may delay sidelink transmissions and effectively rate match the sidelink transmission in the second slot 610. In other cases, similarly as discussed with reference to FIG. 5, the sidelink communications may be configured with less symbols (e.g., 13 symbols) for each sidelink slot when a 60 kHz SCS is used.

Figure 7:
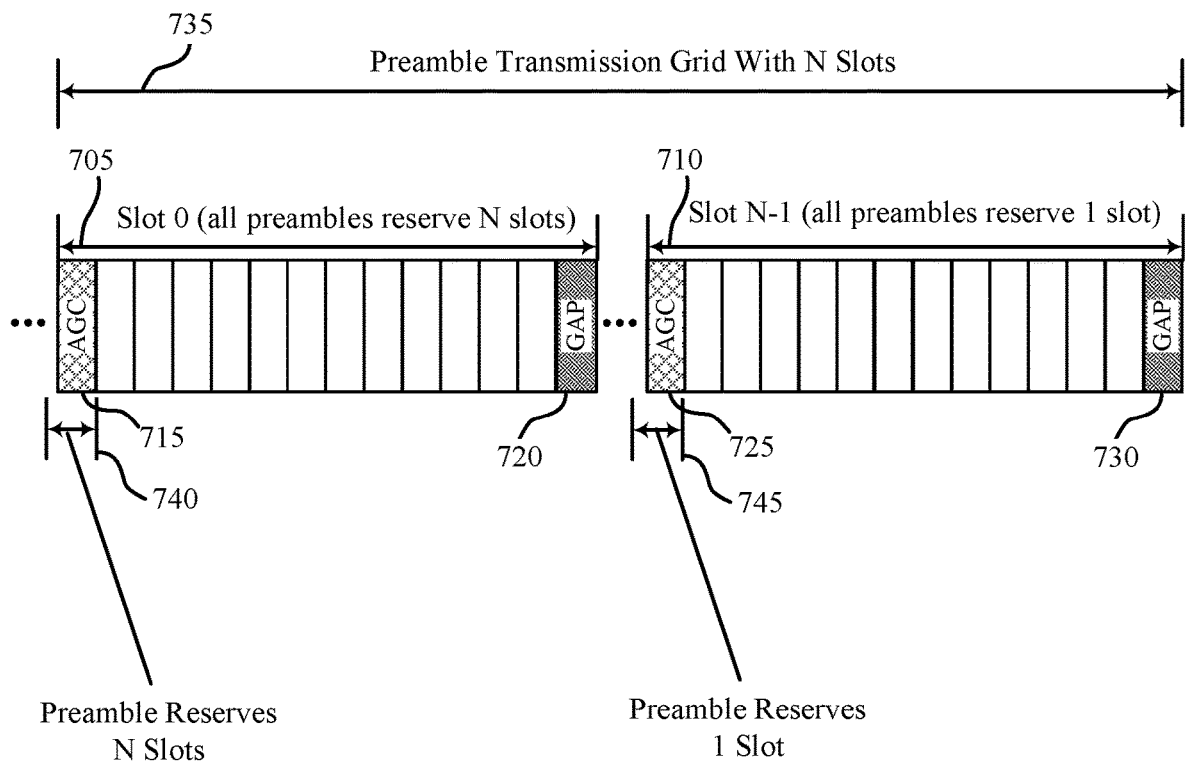
FIG. 7 illustrates an example of a multiple slot reservation technique that supports preamble transmission in sidelink communications using shared radio frequency spectrum in accordance with aspects of the present disclosure.

FIG. 7 illustrates an example of a multiple slot reservation technique 700 that supports preamble transmission in sidelink communications using shared radio frequency spectrum in accordance with aspects of the present disclosure. In some examples, multiple slot reservation technique 700 may implement aspects of wireless communications system 100 or 200. In this example, a preamble transmission grid 735 may be configured that spans multiple slots (e.g., N slots in this example).

As discussed herein, in some RATs (e.g., in NR), a slot duration may be dependent upon SCS, such that each slot can be 1 ms/0.5 ms/0.25 ms depending on the numerology, for example. Due to the potentially different slot durations, if a COT is defined that corresponds to a particular time period (e.g., 1.008 ms), the number of slots within the COT thus also depends on the SCS used for communications. In some cases, the preamble transmission grid 735 may have a duration that is based at least in part on the SCS, and an initial preamble 740 in an initial slot 705 may reserve the N slots of the preamble transmission grid 735, and subsequent preambles such as second preamble 745 transmitted in a second slot 710 (e.g., slot N-1) may reserve one slot. In this example, the initial slot 705 may include AGC symbol 715 and gap symbol 720, and the second slot 710 may include AGC symbol 725 and gap symbol 730. The preamble transmission timing may be determined relative to the AGC symbols 715 and 725 in accordance with techniques as discussed with reference to FIGS. 4 through 6.

In some cases, the initial preamble 740 and the second preamble 745 may explicitly indicate the duration of reservation (e.g., using an indication similar to a slot length indication that is provided in sidelink communications). In some cases, to help reduce the potential system overhead, a subset of sidelink nodes may be configured to include a common preamble (e.g., a sidelink group leader can transmit the common preamble). Such preamble transmissions by a subset of UEs may enhance overall system efficiency in cases where preamble transmission leads into reduced sidelink transmission duration (e.g., when an additional gap symbol is configured to accommodate preamble transmission). In other cases, the preamble may indicate a duration beyond one slot, which may reduce the Wi-Fi preamble overhead, especially with larger SCS (e.g., 60 kHz SCS). In some cases, one sidelink UE may reserve the medium for a longer duration than a single slot, and may provide for COT sharing with other UEs. For example, the preamble can indicate one slot, two slots, and up to N slots (up to maximum allowed COT duration). In some cases, in order to further reduce the likelihood of medium collision, one sidelink UE (e.g., a sidelink group leader) may send the Wi-Fi preamble to convey the COT reservation information on behalf of one or more other sidelink UEs. In some cases, when a different UE indicates different COT length, the preamble transmission may interfere with transmissions of another UE and single frequency network (SFN) gain with single slot based reservation may be lost. In such cases, the preamble transmission grid 735 may allow that the preamble reservation duration ends at the predefined grid on a given resource pool, which may mitigate the reduction in SFN gain.

While various examples discussed herein use a Wi-Fi preamble as an example, the techniques discussed herein may be applied to any types of channel reservation signals associated with a second RAT that may be transmitted by a transmitter of a first RAT when using shared radio frequency spectrum. For example, the examples of FIGS. 3 through 7 use a Wi-Fi preamble on a DSRC band. The DSRC band may use a 10 MHz bandwidth, and the Wi-Fi preamble may include the 16 μs L-STF, 16 μs L-LTF and 8 μs L-SIG. However, in other deployments (e.g., not using the DSRC band), the Wi-Fi preamble may be transmitted over an entire 20 MHz band and include a 8 μs L-STF, 8 μs L-LTF and 4 μs L-SIG. Techniques as discussed herein may also be applied for Wi-Fi preambles with 20 MHz bandwidth transmission for sidelink operations in the unlicensed or shared radio frequency spectrum band. Due to the shorter Wi-Fi preamble with 20 MHz transmission (i.e., 20 μs), the starting time for the preamble transmission may extend outside of an AGC symbol only for higher SCS configurations (e.g., 60 kHz SCS). In other cases, other RAT preambles or channel reservation signals may be transmitted by a sidelink UE using similar techniques. Accordingly, in accordance with various aspects discussed herein, the preamble can be a DSRC preamble in DSRC band, the preamble can be a Wi-Fi preamble with 20 MHz band or in the DSRC band, the preamble can be any common preamble which can be understood by multiple RATs, or any combinations thereof. Further, the preamble power can be aligned with the subsequent sidelink communications power for AGC operation, and the bandwidth spanned by preamble can be different from the subsequent sidelink communications.

Figure 8:
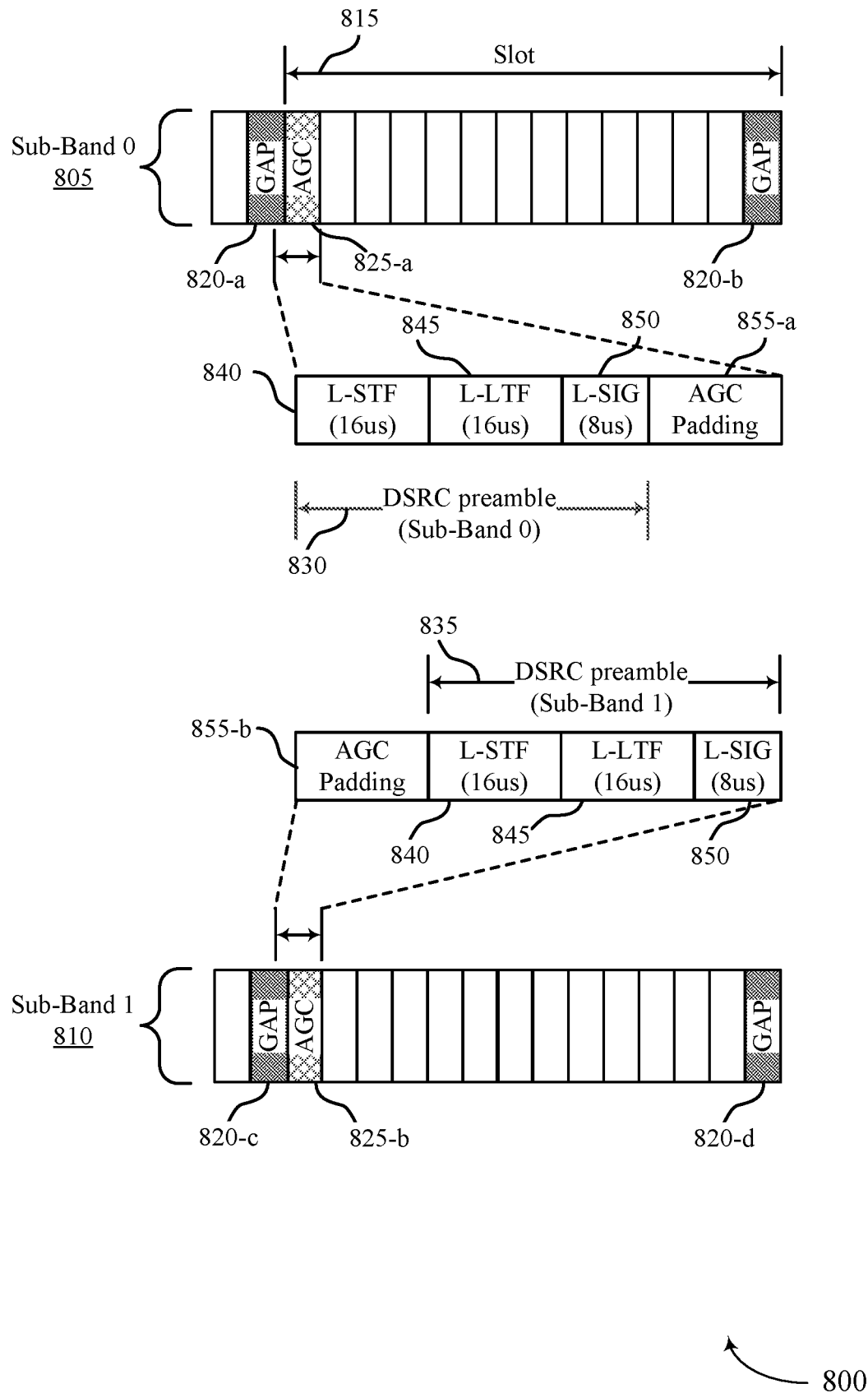
FIG. 8 illustrates an example of a multiple sub-band reservation technique that supports preamble transmission in sidelink communications using shared radio frequency spectrum in accordance with aspects of the present disclosure.

FIG. 8 illustrates an example of a multiple sub-band reservation technique 800 that supports preamble transmission in sidelink communications using shared radio frequency spectrum in accordance with aspects of the present disclosure. In some examples, multiple sub-band reservation technique 800 may implement aspects of wireless communications system 100 or 200. In this example, techniques as discussed herein may be used for wideband communications that span two or more sub-bands, including a first sub-band 805 and a second sub-band 810, for a slot 815. The slot 815 may include gap symbol 820 and AGC symbol 825, as discussed herein.

In this example, a first channel reservation preamble 830 may be transmitted on the first sub-band 805, and a second channel reservation preamble 835 may be transmitted on the second sub-band 810. Thus, in this example, the sidelink UE may transmit preambles on each 20 MHz sub-band if it occupies multiple sub-bands. In some cases, to avoid relatively large PAPR due to the preamble repetition on multiple sub-bands, time domain dithering may be employed in which the preambles on different sub-bands can be transmitted at a different time. In this example, the first channel reservation preamble 830 may include L-STF 840, L-LTF 845, L-SIG 850, and AGC padding 855-*a* that follows the L-SIG 850. The second channel reservation preamble 835 may then include AGC padding 855-*b* prior to the L-STF 840, L-LTF 845, and L-SIG 850. Thus, the AGC padding 855 may be inserted before or after other preamble fields to provide a time offset. In some cases, to enhance SFN gain on preamble transmissions, the sub-band specific dithering in time is common across all nodes (e.g., all nodes will use the same dithering on a given sub-band for preamble transmission).

Figure 9:
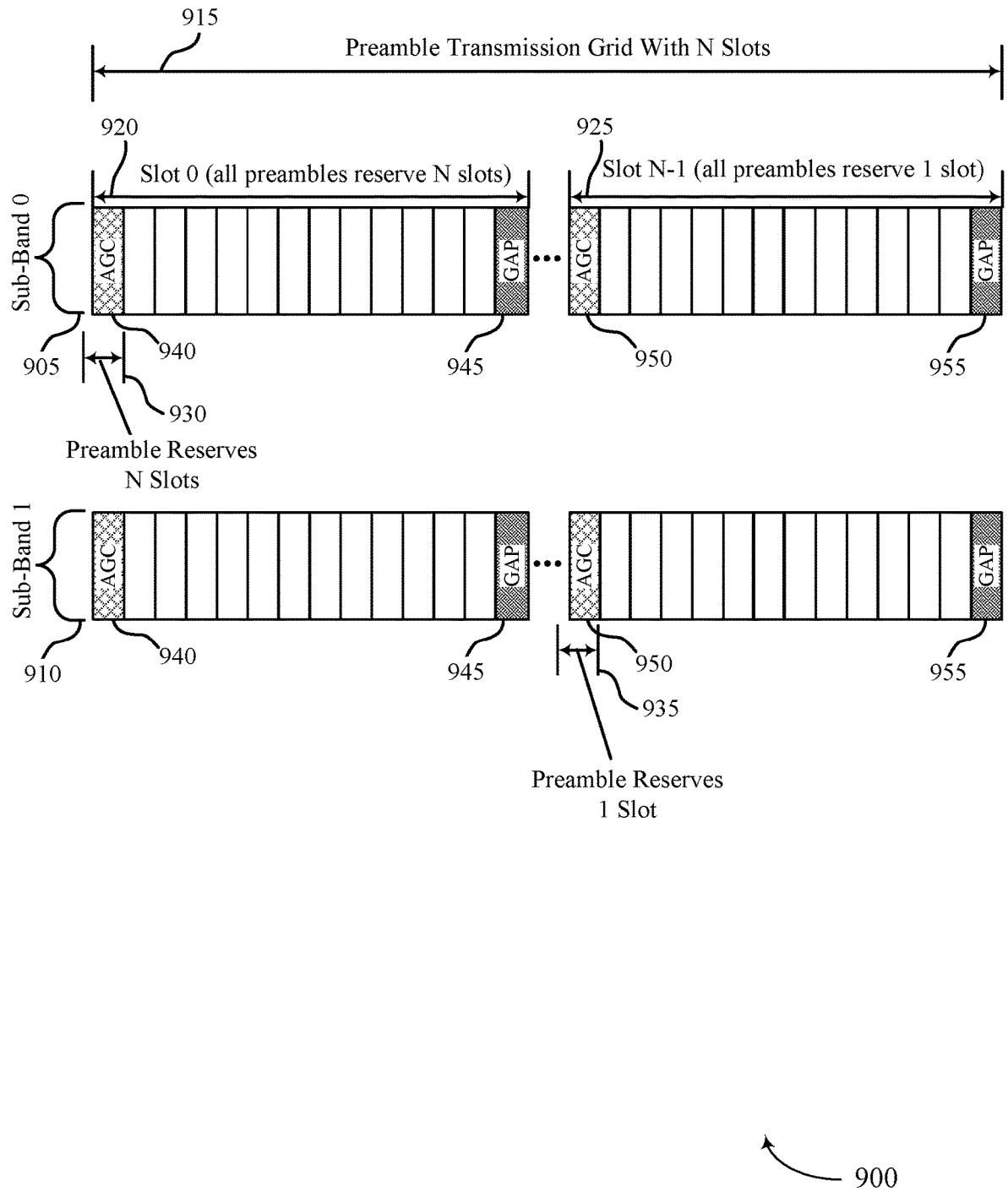
FIG. 9 illustrates an example of a multiple slot and sub-band reservation technique that supports preamble transmission in sidelink communications using shared radio frequency spectrum in accordance with aspects of the present disclosure.

FIG. 9 illustrates an example of a multiple slot and sub-band reservation technique 900 that supports preamble transmission in sidelink communications using shared radio frequency spectrum in accordance with aspects of the present disclosure. In some examples, multiple slot and sub-band reservation technique 900 may implement aspects of wireless communications system 100 or 200. In this example, techniques as discussed herein may be used for wideband communications that span two or more sub-bands, including a first sub-band 905 and a second sub-band 910, for multiple slots in a preamble transmission grid 915 that may include a first slot 920 and a second slot 925 (e.g. slot N-1 of N slots of the preamble transmission grid 915). The first slot 920 may include AGC symbol 940 and gap symbol 945, and the second slot 925 may include AGC symbol 950 and gap symbol 955, as discussed herein.

In this example, a first channel reservation preamble 930 may be transmitted on a single sub-band such as the first sub-band 905, and may reserve multiple slots (e.g., N slots) of the preamble transmission grid 915. Thus, in this example, when the sidelink transmission spans multiple 20 MHz sub-bands, the first channel reservation preamble 930 may be transmitted on one of the 20 MHz sub-bands. In some cases, the UE may randomly select one the of the sub-bands for preamble transmission, or the sub-band may be selected based on a configuration. In addition, if a first UE occupies both the first sub-band 905 and the second sub-band 910, when it transmits the first channel reservation preamble 930 on the first sub-band 905, another UE may transmit a second channel reservation preamble 935 on the second sub-band 910 on behalf of the first UE.

Figure 10:
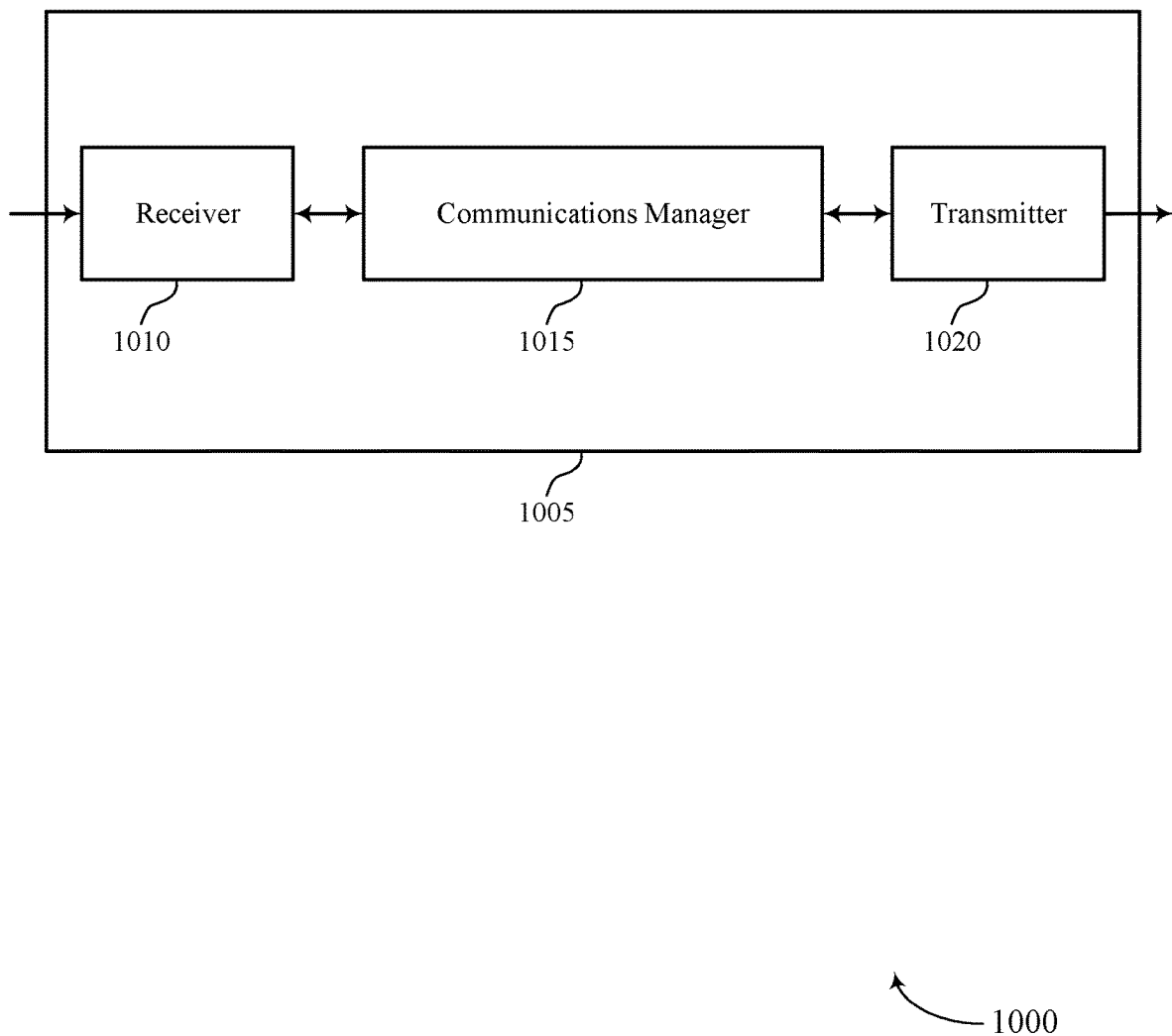
FIGS. 10 and 11 show block diagrams of devices that support preamble transmission in sidelink communications using shared radio frequency spectrum in accordance with aspects of the present disclosure.

FIG. 10 shows a block diagram 1000 of a device 1005 that supports preamble transmission in sidelink communications using shared radio frequency spectrum in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to preamble transmission in sidelink communications using shared radio frequency spectrum, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a first symbol of a sidelink communications frame of a first RAT that uses a shared radio frequency spectrum band for sidelink communications between UEs, determine a start time for a channel reservation preamble associated with a second RAT relative to the first symbol, where the channel reservation preamble spans a preamble duration that is longer than a symbol duration of the first symbol of the sidelink communications frame, and transmit the channel reservation preamble based on the determined start time.

The communications manager 1015 may also identify a plurality of sub-bands of a shared radio frequency spectrum band for sidelink communications between UEs using a first radio access technology, determine, for each sub-band of the plurality of sub-bands, a start time for a channel reservation preamble associated with a second radio access technology, wherein the start time for each sub-band is determined relative to a boundary of a first symbol, and wherein different sub-bands have different start times, and transmit the channel reservation preamble on one or more of the plurality of sub-bands based at least in part on the determined start time. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
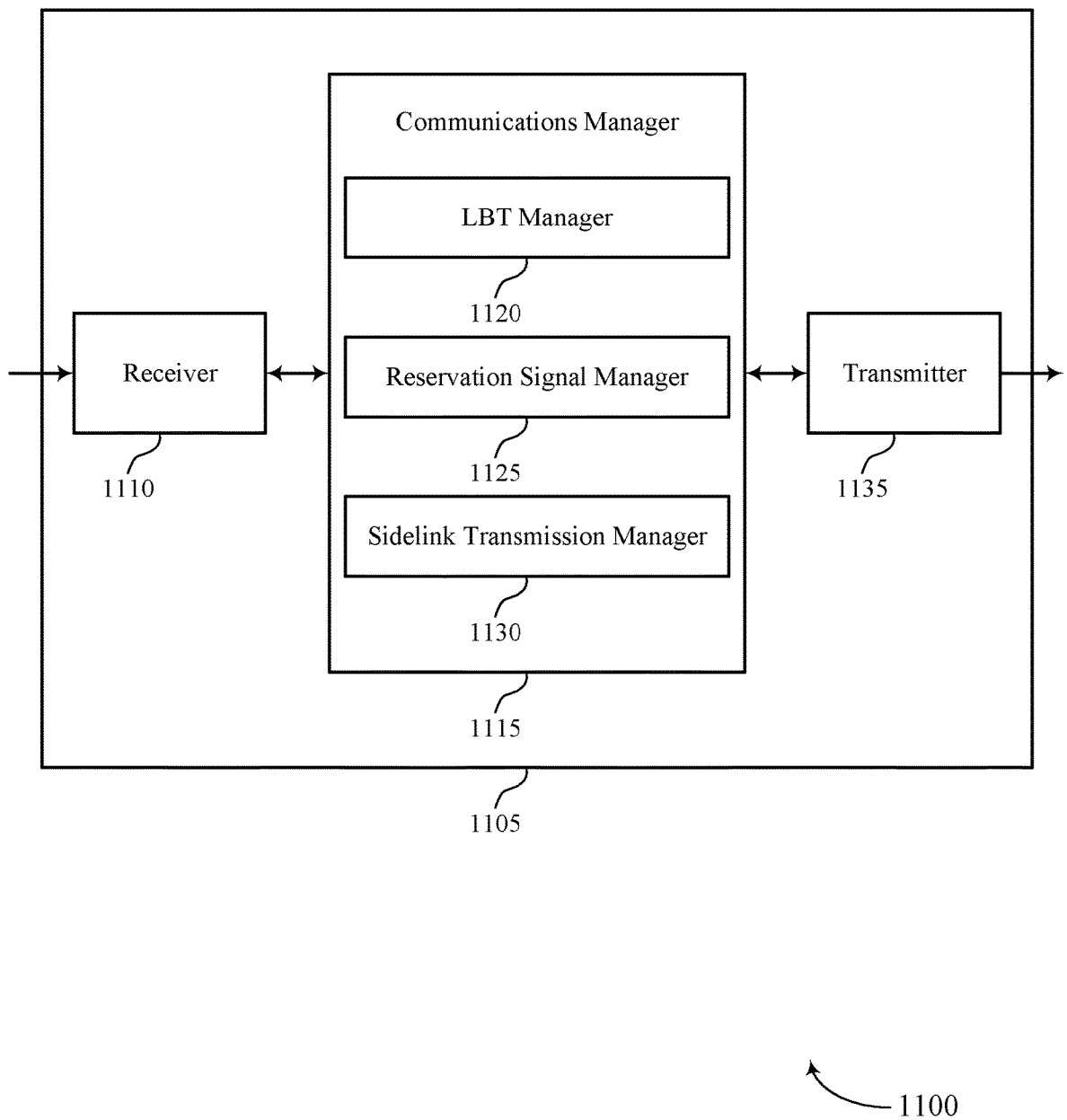

FIG. 11 shows a block diagram 1100 of a device 1105 that supports preamble transmission in sidelink communications using shared radio frequency spectrum in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to preamble transmission in sidelink communications using shared radio frequency spectrum, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a LBT manager 1120, a reservation signal manager 1125, and a sidelink transmission manager 1130. The communications manager 1115 may be an example of aspects of the communications manager 1310 described herein.

The LBT manager 1120 may identify a first symbol of a sidelink communications frame of a first RAT that uses a shared radio frequency spectrum band for sidelink communications between UEs.

The reservation signal manager 1125 may determine a start time for a channel reservation preamble associated with a second RAT relative to the first symbol, where the channel reservation preamble spans a preamble duration that is longer than a symbol duration of the first symbol of the sidelink communications frame.

The sidelink transmission manager 1130 may transmit the channel reservation preamble based on the determined start time.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
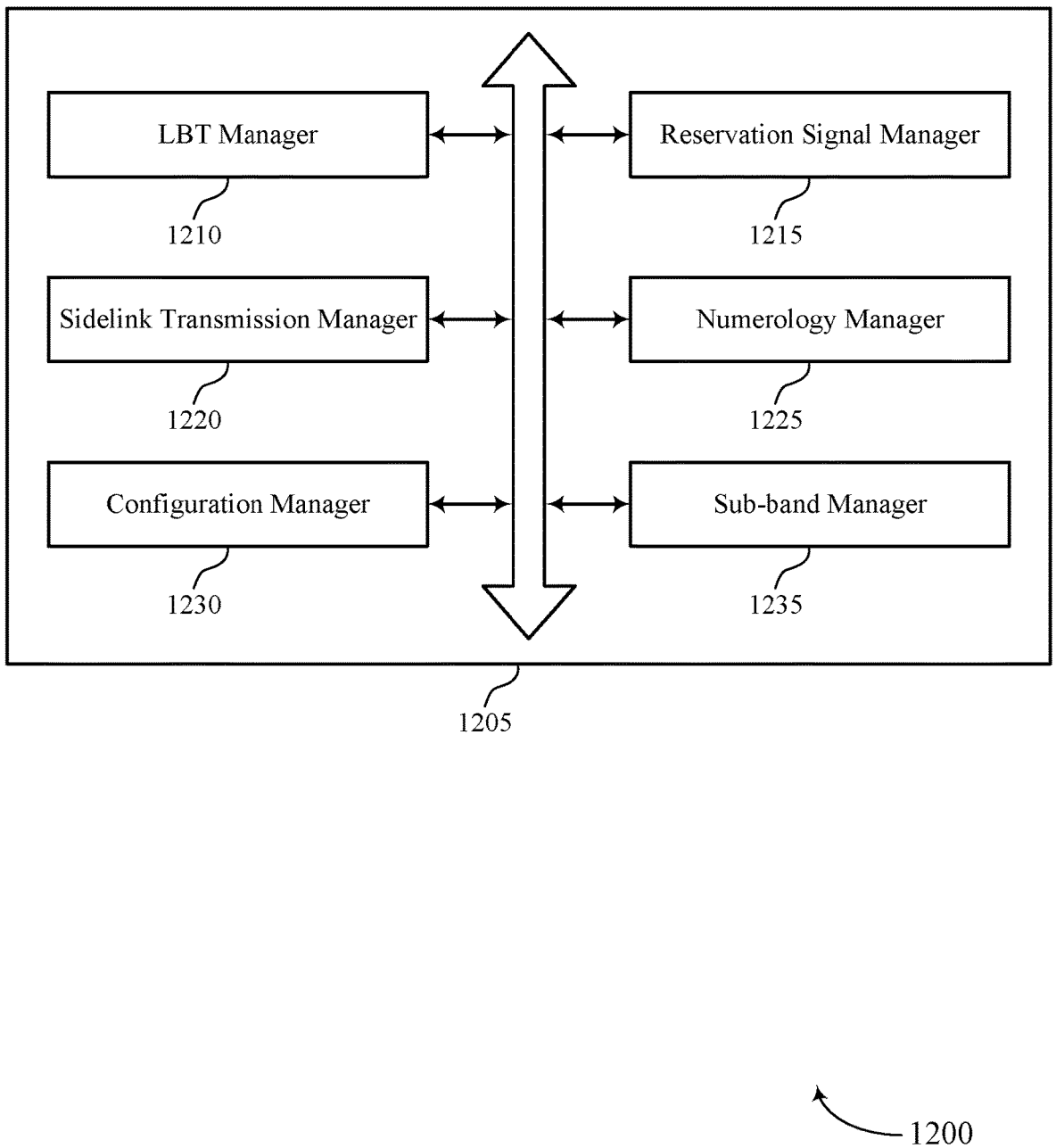
FIG. 12 shows a block diagram of a communications manager that supports preamble transmission in sidelink communications using shared radio frequency spectrum in accordance with aspects of the present disclosure.

FIG. 12 shows a block diagram 1200 of a communications manager 1205 that supports preamble transmission in sidelink communications using shared radio frequency spectrum in accordance with aspects of the present disclosure. The communications manager 1205 may be an example of aspects of a communications manager 1015, a communications manager 1115, or a communications manager 1310 described herein. The communications manager 1205 may include a LBT manager 1210, a reservation signal manager 1215, a sidelink transmission manager 1220, a numerology manager 1225, a configuration manager 1230, and a sub-band manager 1235. Each of these modules may communicate, directly or indirectly, with one another (e.g., via one or more buses).

The LBT manager 1210 may identify a first symbol of a sidelink communications frame of a first RAT that uses a shared radio frequency spectrum band for sidelink communications between UEs.

The reservation signal manager 1215 may determine a start time for a channel reservation preamble associated with a second RAT relative to the first symbol, where the channel reservation preamble spans a preamble duration that is longer than a symbol duration of the first symbol of the sidelink communications frame. In some cases, the first RAT is a NR RAT and the second RAT is a Wi-Fi RAT based on IEEE 802.11 protocols or a DSRC RAT. In some cases, the first symbol of the sidelink communications frame is an initial symbol of the sidelink communications frame and is used for AGC at a receiving UE, and a second symbol of the sidelink communications frame subsequent to the first symbol is used for sidelink data transmission, and where the start time for the channel reservation preamble is prior to the first symbol such that the preamble duration ends prior to the second symbol of the sidelink communications frame. In some cases, a gap symbol is configured prior to the first symbol of the sidelink communications frame and provides for switching of receiver hardware at the UE between transmission and reception configurations, and where the start time for the channel reservation preamble is during the gap symbol.

In some cases, the channel reservation preamble includes an indication of a number of symbols of the sidelink communications frame are spanned by the channel reservation preamble. In some cases, a set of UEs transmit and receive sidelink communications, and where a subset of the set of UEs are configured to transmit the channel reservation preamble. In some cases, the channel reservation preamble further includes a channel occupancy time that is greater than one slot of the first RAT. In some cases, the channel occupancy time is shared by all of the UEs of the set of UEs. In some cases, the channel occupancy time ends at a predetermined location of a resource pool configured for sidelink communications.

The sidelink transmission manager 1220 may transmit the channel reservation preamble based on the determined start time. In some examples, the sidelink communications within the sidelink communications frame are rate-matched around the channel reservation preamble. In some cases, the first symbol of the sidelink communications frame includes data transmission resources (e.g., PSBCH resources), and where the channel reservation preamble punctures the data transmission resources of the first symbol. In some cases, the preamble duration spans more than two symbol durations of the first RAT, and the start time for the channel reservation preamble is more than one symbol prior to the first symbol of the sidelink communications frame. In some cases, the start time for the channel reservation preamble punctures a data transmission of a prior sidelink communications frame that is prior to the first symbol.

In some cases, the preamble duration spans an initial two symbols of the sidelink communications frame. In some cases, the start time for the channel reservation preamble is prior to the first symbol of the sidelink communications frame. In some cases, the first symbol of the sidelink communications frame is an AGC symbol, and where a transmission power associated with the channel reservation preamble is selected to be aligned with a subsequent sidelink transmission power.

The numerology manager 1225 may determine the symbol duration of the first symbol from a set of available symbol durations of the first RAT. In some examples, the numerology manager 1225 may determine the start time for the channel reservation preamble relative to the sidelink communications frame based on the symbol duration of the first symbol.

The configuration manager 1230 may receive a sidelink configuration that provides for an early termination of sidelink communications in sidelink communications frames that occur prior to the channel reservation preamble. In some examples, the configuration manager 1230 may receive a sidelink configuration that provides for fewer symbols for sidelink data transmissions in slots where the channel reservation preamble is to be transmitted.

The sub-band manager 1235 may perform communications on multiple sub-bands for wideband communications. In some cases, the sidelink communications are transmitted using a set of sub-bands of the shared radio frequency spectrum band, and where the channel reservation preamble is transmitted on each of the set of sub-bands. In some cases, a first instance of the channel reservation preamble is transmitted on a first sub-band starting at the determined start time for the channel reservation preamble, and a second instance of the channel reservation preamble is transmitted on a second sub-band starting at a time offset relative to the determined start time. In some cases, the time offset of the second sub-band is common across a set of UEs that transmit and receive sidelink communications.

In some cases, the sidelink communications are transmitted using a set of sub-bands of the shared radio frequency spectrum band, and where the channel reservation preamble is transmitted on one sub-band of the set of sub-bands. In some cases, the one sub-band of the set of sub-bands used to transmit the channel reservation preamble is selected randomly from the set of sub-bands. In some cases, one or more other UEs transmits the channel reservation preamble on one or more other sub-bands of the set of sub-bands.

Figure 13:
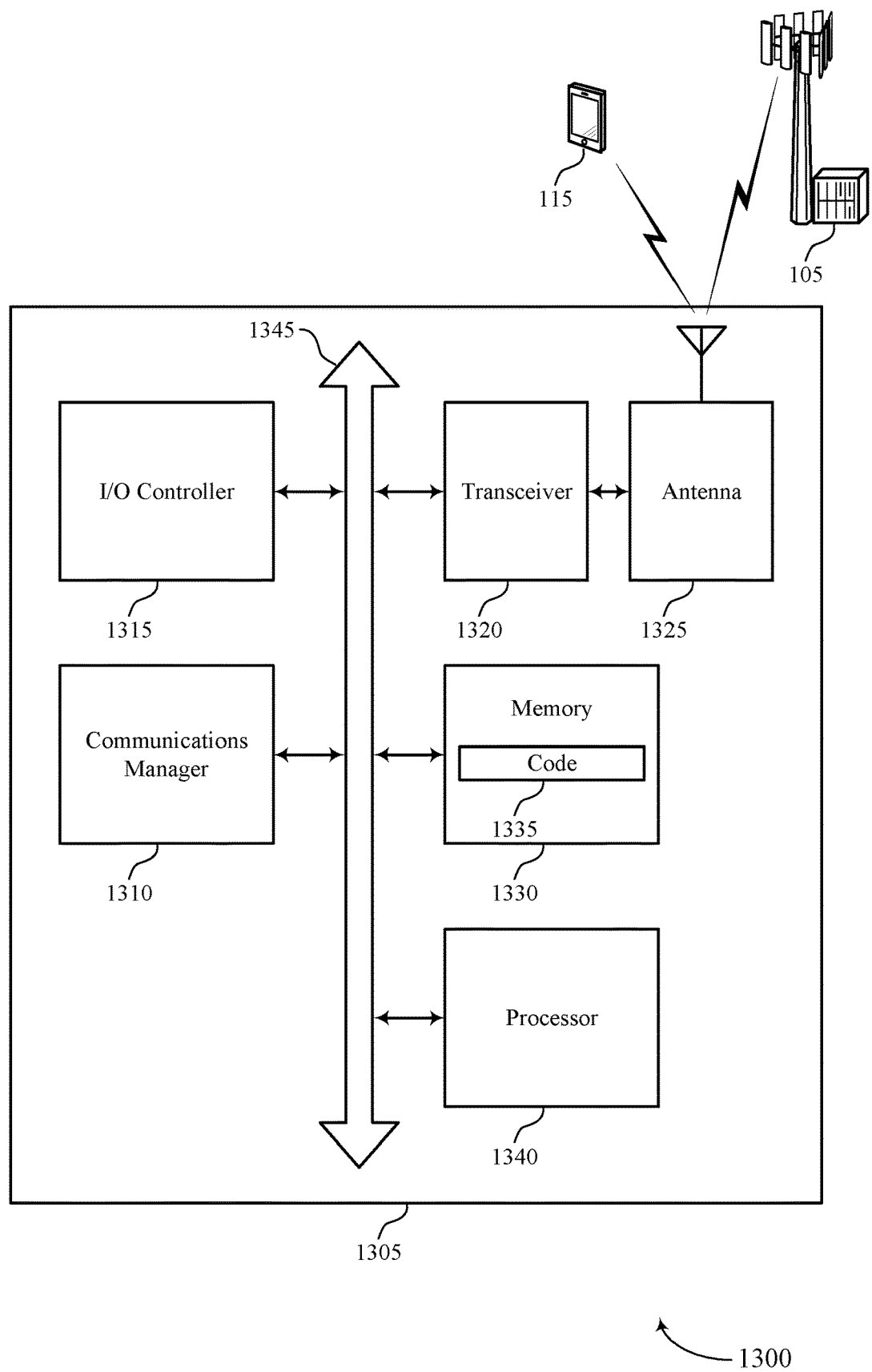
FIG. 13 shows a diagram of a system including a device that supports preamble transmission in sidelink communications using shared radio frequency spectrum in accordance with aspects of the present disclosure.

FIG. 13 shows a diagram of a system 1300 including a device 1305 that supports preamble transmission in sidelink communications using shared radio frequency spectrum in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify a first symbol of a sidelink communications frame of a first RAT that uses a shared radio frequency spectrum band for sidelink communications between UEs, determine a start time for a channel reservation preamble associated with a second RAT relative to the first symbol, where the channel reservation preamble spans a preamble duration that is longer than a symbol duration of the first symbol of the sidelink communications frame, and transmit the channel reservation preamble based on the determined start time.

The communications manager 1310 may also identify a plurality of sub-bands of a shared radio frequency spectrum band for sidelink communications between UEs using a first radio access technology, determine, for each sub-band of the plurality of sub-bands, a start time for a channel reservation preamble associated with a second radio access technology, wherein the start time for each sub-band is determined relative to a boundary of a first symbol, and wherein different sub-bands have different start times, and transmit the channel reservation preamble on one or more of the plurality of sub-bands based at least in part on the determined start time.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting preamble transmission in sidelink communications using shared radio frequency spectrum).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
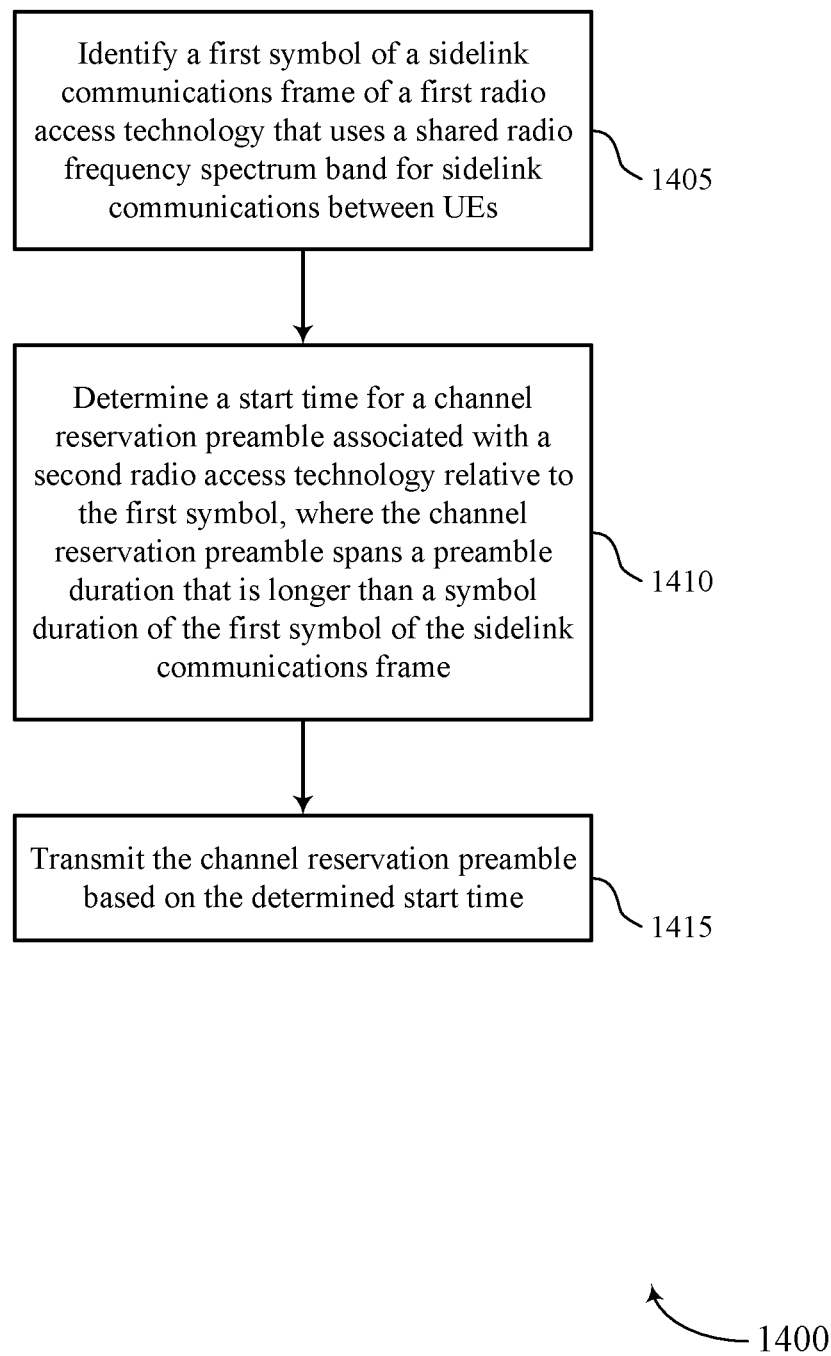
FIGS. 14 through 18 show flowcharts illustrating methods that support preamble transmission in sidelink communications using shared radio frequency spectrum in accordance with aspects of the present disclosure.

FIG. 14 shows a flowchart illustrating a method 1400 that supports preamble transmission in sidelink communications using shared radio frequency spectrum in accordance with aspects of the present disclosure. The operations of method 1400 may be implemented by a UE 115 or its components as described herein. For example, the operations of method 1400 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1405, the UE may identify a first symbol of a sidelink communications frame of a first RAT that uses a shared radio frequency spectrum band for sidelink communications between UEs. The operations of 1405 may be performed according to the methods described herein. In some examples, aspects of the operations of 1405 may be performed by a LBT manager as described with reference to FIGS. 10 through 13.

At 1410, the UE may determine a start time for a channel reservation preamble associated with a second RAT relative to the first symbol, where the channel reservation preamble spans a preamble duration that is longer than a symbol duration of the first symbol of the sidelink communications frame. The operations of 1410 may be performed according to the methods described herein. In some examples, aspects of the operations of 1410 may be performed by a reservation signal manager as described with reference to FIGS. 10 through 13.

At 1415, the UE may transmit the channel reservation preamble based on the determined start time. The operations of 1415 may be performed according to the methods described herein. In some examples, aspects of the operations of 1415 may be performed by a sidelink transmission manager as described with reference to FIGS. 10 through 13.

Figure 15:
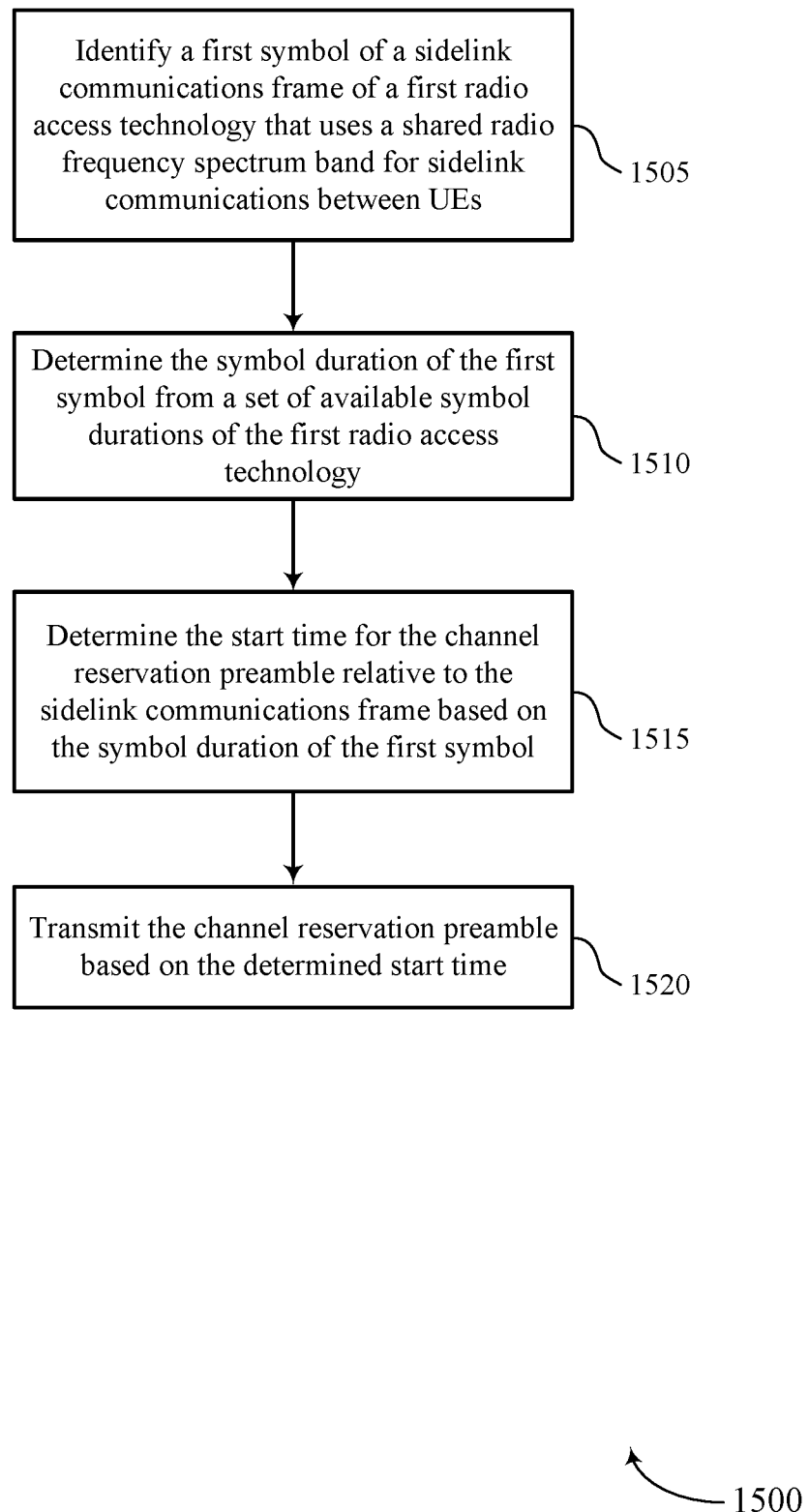

FIG. 15 shows a flowchart illustrating a method 1500 that supports preamble transmission in sidelink communications using shared radio frequency spectrum in accordance with aspects of the present disclosure. The operations of method 1500 may be implemented by a UE 115 or its components as described herein. For example, the operations of method 1500 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1505, the UE may identify a first symbol of a sidelink communications frame of a first RAT that uses a shared radio frequency spectrum band for sidelink communications between UEs. The operations of 1505 may be performed according to the methods described herein. In some examples, aspects of the operations of 1505 may be performed by a LBT manager as described with reference to FIGS. 10 through 13.

At 1510, the UE may determine the symbol duration of the first symbol from a set of available symbol durations of the first RAT. The operations of 1510 may be performed according to the methods described herein. In some examples, aspects of the operations of 1510 may be performed by a numerology manager as described with reference to FIGS. 10 through 13.

At 1515, the UE may determine the start time for the channel reservation preamble relative to the sidelink communications frame based on the symbol duration of the first symbol. The operations of 1515 may be performed according to the methods described herein. In some examples, aspects of the operations of 1515 may be performed by a numerology manager as described with reference to FIGS. 10 through 13.

At 1520, the UE may transmit the channel reservation preamble based on the determined start time. The operations of 1520 may be performed according to the methods described herein. In some examples, aspects of the operations of 1520 may be performed by a sidelink transmission manager as described with reference to FIGS. 10 through 13.

Figure 16:
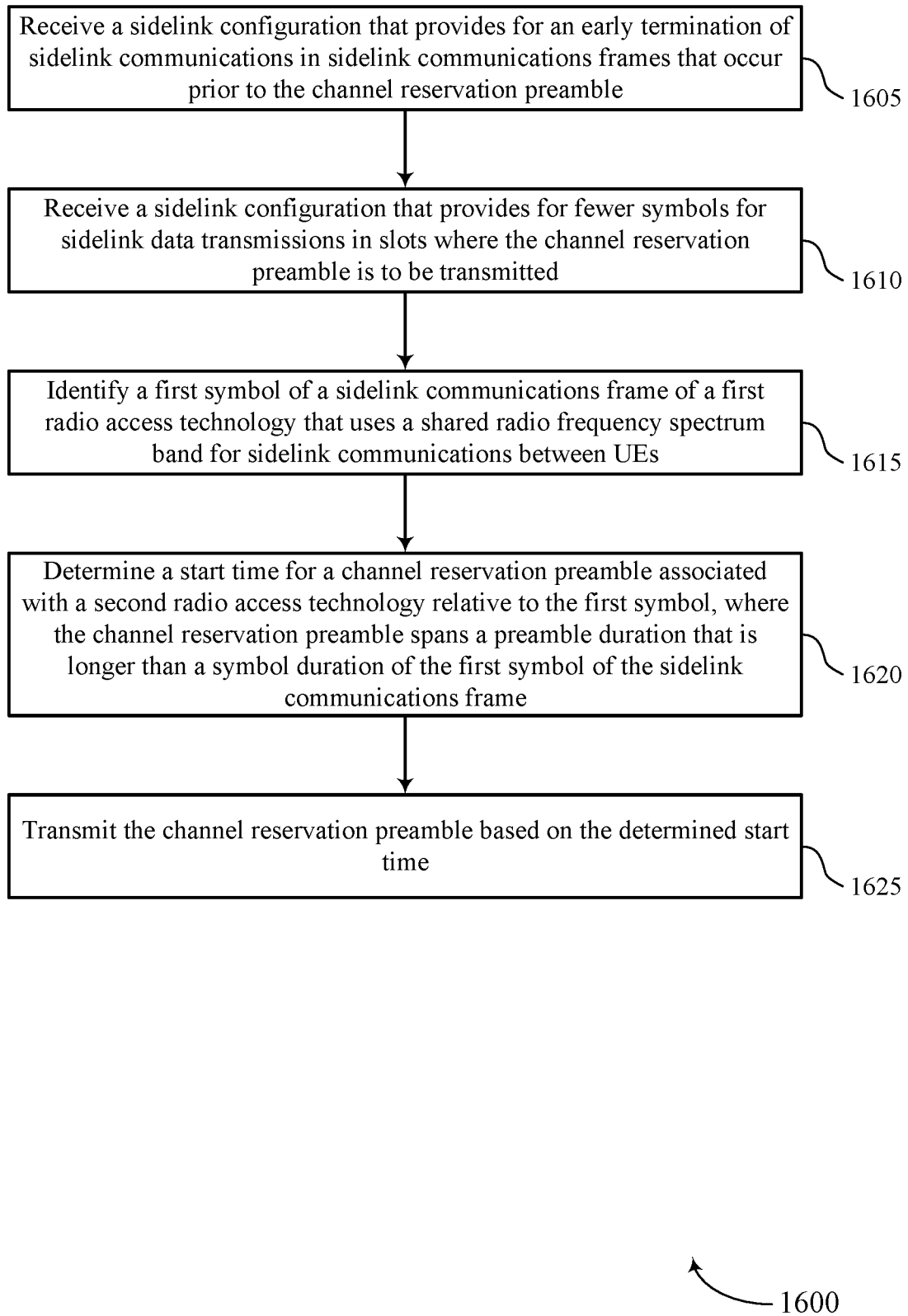

FIG. 16 shows a flowchart illustrating a method 1600 that supports preamble transmission in sidelink communications using shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1605, the UE may receive a sidelink configuration that provides for an early termination of sidelink communications in sidelink communications frames that occur prior to the channel reservation preamble. The operations of 1605 may be performed according to the methods described herein. In some examples, aspects of the operations of 1605 may be performed by a configuration manager as described with reference to FIGS. 10 through 13. In some cases, the preamble duration spans more than two symbol durations of the first RAT, and the start time for the channel reservation preamble is more than one symbol prior to the first symbol of a sidelink communications frame. In some cases, the start time for the channel reservation preamble punctures a data transmission of a prior sidelink communications frame that is prior to the first symbol.

At 1610, the UE may receive a sidelink configuration that provides for fewer symbols for sidelink data transmissions in slots where the channel reservation preamble is to be transmitted. The operations of 1610 may be performed according to the methods described herein. In some examples, aspects of the operations of 1610 may be performed by a configuration manager as described with reference to FIGS. 10 through 13.

At 1615, the UE may identify a first symbol of a sidelink communications frame of a first RAT that uses a shared radio frequency spectrum band for sidelink communications between UEs. The operations of 1615 may be performed according to the methods described herein. In some examples, aspects of the operations of 1615 may be performed by a LBT manager as described with reference to FIGS. 10 through 13.

At 1620, the UE may determine a start time for a channel reservation preamble associated with a second RAT relative to the first symbol, where the channel reservation preamble spans a preamble duration that is longer than a symbol duration of the first symbol of the sidelink communications frame. The operations of 1620 may be performed according to the methods described herein. In some examples, aspects of the operations of 1620 may be performed by a reservation signal manager as described with reference to FIGS. 10 through 13.

At 1625, the UE may transmit the channel reservation preamble based on the determined start time. The operations of 1625 may be performed according to the methods described herein. In some examples, aspects of the operations of 1625 may be performed by a sidelink transmission manager as described with reference to FIGS. 10 through 13.

Figure 17:
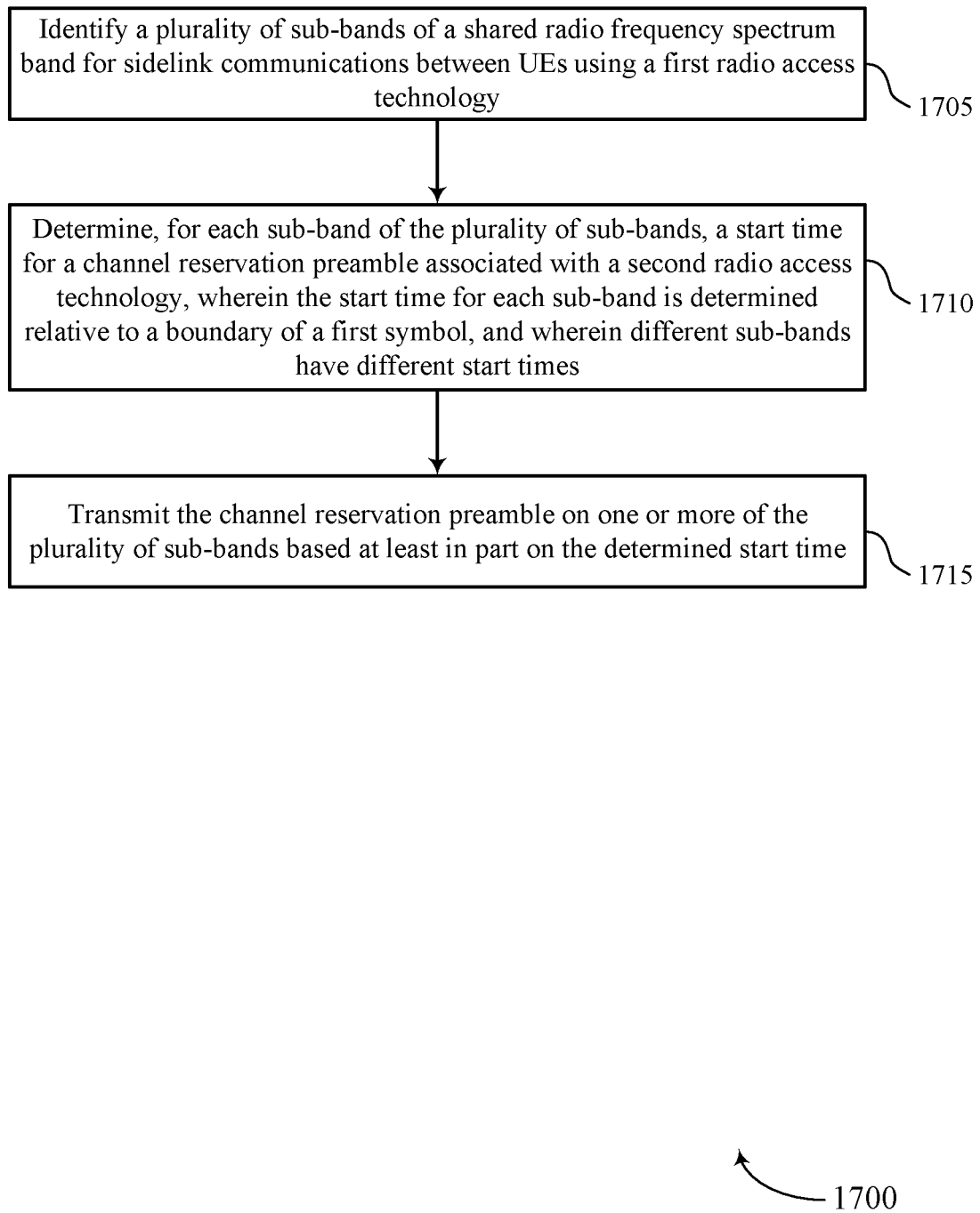

FIG. 17 shows a flowchart illustrating a method 1700 that supports preamble transmission in sidelink communications using shared radio frequency spectrum in accordance with aspects of the present disclosure. The operations of method 1700 may be implemented by a UE 115 or its components as described herein. For example, the operations of method 1700 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the UE may identify a plurality of sub-bands of a shared radio frequency spectrum band for sidelink communications between UEs using a first radio access technology. The operations of 1705 may be performed according to the methods described herein. In some examples, aspects of the operations of 1705 may be performed by a configuration manager as described with reference to FIGS. 10 through 13.

At 1710, the UE may determine, for each sub-band of the plurality of sub-bands, a start time for a channel reservation preamble associated with a second radio access technology, wherein the start time for each sub-band is determined relative to a boundary of a first symbol, and wherein different sub-bands have different start times. The operations of 1710 may be performed according to the methods described herein. In some examples, aspects of the operations of 1710 may be performed by a reservation signal manager as described with reference to FIGS. 10 through 13.

At 1715, the UE may transmit the channel reservation preamble on one or more of the plurality of sub-bands based at least in part on the determined start time. The operations of 1715 may be performed according to the methods described herein. In some examples, aspects of the operations of 1715 may be performed by a sidelink transmission manager as described with reference to FIGS. 10 through 13.

Figure 18:
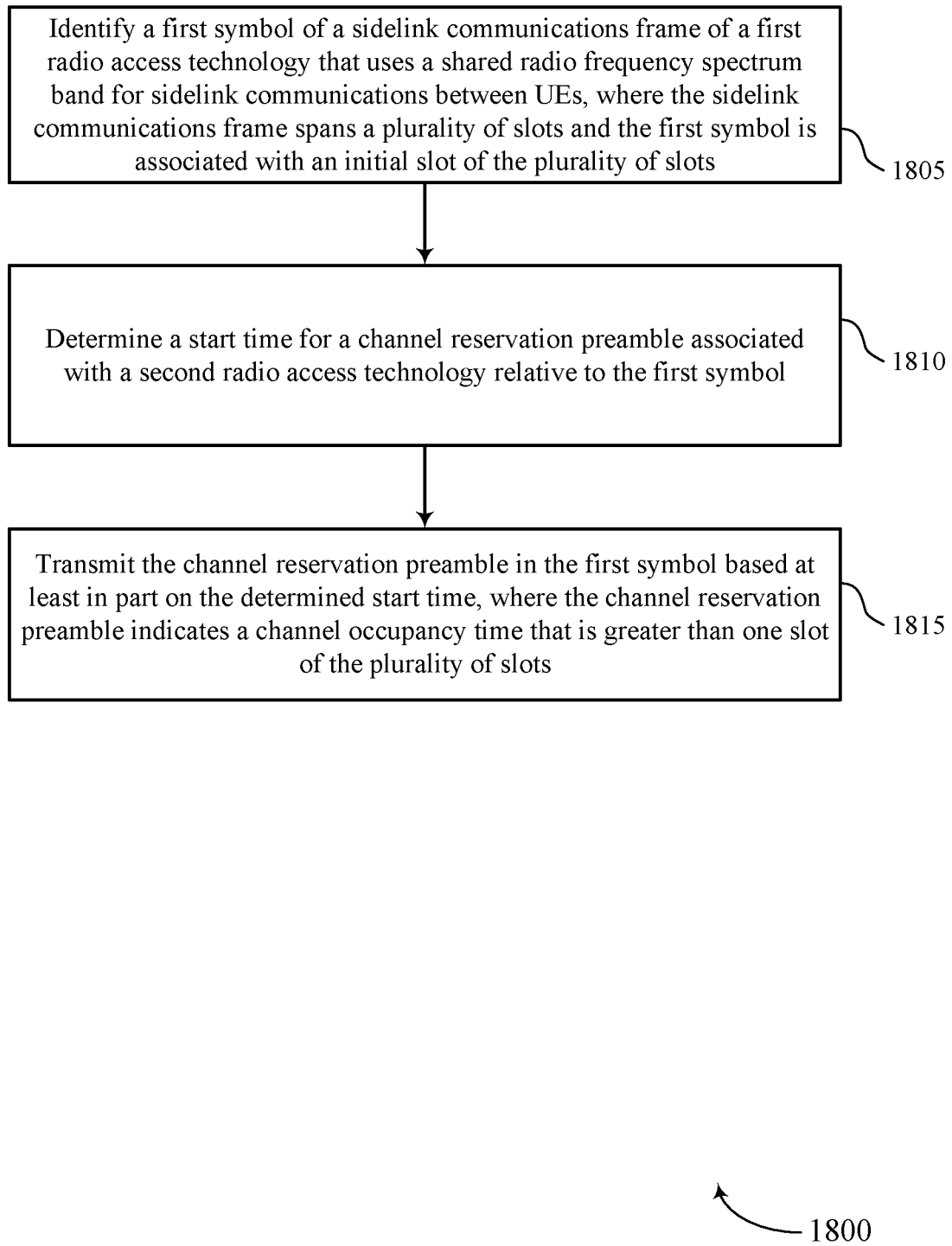

FIG. 18 shows a flowchart illustrating a method 1800 that supports preamble transmission in sidelink communications using shared radio frequency spectrum in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a first symbol of a sidelink communications frame of a first radio access technology that uses a shared radio frequency spectrum band for sidelink communications between UEs, where the sidelink communications frame spans a plurality of slots and the first symbol is associated with an initial slot of the plurality of slots. The operations of 1805 may be performed according to the methods described herein. In some examples, aspects of the operations of 1805 may be performed by a configuration manager as described with reference to FIGS. 10 through 13.

At 1810, the UE may determine a start time for a channel reservation preamble associated with a second radio access technology relative to the first symbol. The operations of 1810 may be performed according to the methods described herein. In some examples, aspects of the operations of 1810 may be performed by a reservation signal manager as described with reference to FIGS. 10 through 13.

At 1815, the UE may transmit the channel reservation preamble in the first symbol based at least in part on the determined start time, where the channel reservation preamble indicates a channel occupancy time that is greater than one slot of the plurality of slots. The operations of 1815 may be performed according to the methods described herein. In some examples, aspects of the operations of 1815 may be performed by a sidelink transmission manager as described with reference to FIGS. 10 through 13.

The following provides an overview of aspects of the present disclosure:

Aspect 1: A method for wireless communication at a UE, comprising: identifying a first symbol of a sidelink communications frame of a first radio access technology that uses a shared radio frequency spectrum band for sidelink communications between UEs; determining a start time for a channel reservation preamble associated with a second radio access technology relative to the first symbol, wherein the channel reservation preamble spans a preamble duration that is longer than a symbol duration of the first symbol of the sidelink communications frame; and transmitting the channel reservation preamble based at least in part on the determined start time.

Aspect 2: The method of aspect 1, wherein the determining further comprises: determining the symbol duration of the first symbol from a plurality of available symbol durations of the first radio access technology; and determining the start time for the channel reservation preamble relative to the sidelink communications frame based at least in part on the symbol duration of the first symbol.

Aspect 3: The method of any of aspects 1 through 2, wherein the first radio access technology is a 5G new radio (NR) radio access technology and the second radio access technology is a Wi-Fi radio access technology based on IEEE 802.11 protocols or a dedicated short range communications (DSRC) radio access technology.

Aspect 4: The method of any of aspects 1 through 3, wherein the first symbol of the sidelink communications frame is an initial symbol of the sidelink communications frame and is used for automatic gain control (AGC) at a receiving UE, and a second symbol of the sidelink communications frame subsequent to the first symbol is used for sidelink data transmission, and the start time for the channel reservation preamble is prior to the first symbol such that the preamble duration ends prior to the second symbol of the sidelink communications frame.

Aspect 5: The method of aspect 4, wherein a gap symbol is configured prior to the first symbol of the sidelink communications frame and provides for switching of receiver hardware at the UE between transmission and reception configurations, and the start time for the channel reservation preamble is during the gap symbol.

Aspect 6: The method of any of aspects 1 through 3, wherein the first symbol of the sidelink communications frame includes data transmission resources, and the channel reservation preamble punctures the data transmission resources of the first symbol.

Aspect 7: The method of any of aspects 1 through 6, wherein the preamble duration spans more than two symbol durations of the first radio access technology, and the start time for the channel reservation preamble is more than one symbol prior to the first symbol of the sidelink communications frame.

Aspect 8: The method of aspect 7, wherein the start time for the channel reservation preamble punctures a data transmission of a prior sidelink communications frame that is prior to the first symbol.

Aspect 9: The method of any of aspects 7 through 8, further comprising: receiving a sidelink configuration that provides for an early termination of sidelink communications in sidelink communications frames that occur prior to the channel reservation preamble.

Aspect 10: The method of any of aspects 7 through 9, further comprising: receiving a sidelink configuration that provides for fewer symbols for sidelink data transmissions in slots where the channel reservation preamble is to be transmitted.

Aspect 11: The method of any of aspects 1 through 10, wherein the preamble duration spans an initial two symbols of the sidelink communications frame.

Aspect 12: The method of aspect 11, wherein sidelink communications within the sidelink communications frame are rate-matched around the channel reservation preamble.

Aspect 13: The method of aspect 12, wherein the start time for the channel reservation preamble is prior to the first symbol of the sidelink communications frame.

Aspect 14: The method of any of aspects 1 through 13, wherein the first symbol of the sidelink communications frame is an automatic gain control (AGC) symbol, and a transmission power associated with the channel reservation preamble is selected to be aligned with a subsequent sidelink transmission power.

Aspect 15: A method for wireless communication at a UE, comprising: identifying a first symbol of a sidelink communications frame of a first radio access technology that uses a shared radio frequency spectrum band for sidelink communications between a set of UEs, wherein the sidelink communications frame spans a plurality of slots and the first symbol is associated with an initial slot of the plurality of slots; determining a start time for a channel reservation preamble associated with a second radio access technology relative to the first symbol; and transmitting the channel reservation preamble in the first symbol based at least in part on the determined start time, wherein the channel reservation preamble indicates a channel occupancy time that is greater than one slot of the plurality of slots.

Aspect 16: The method of aspect 15, wherein the channel reservation preamble further includes an indication of a number of symbols of the sidelink communications frame are spanned by the channel reservation preamble.

Aspect 17: The method of aspect 16, wherein a subset of the set of UEs are configured to transmit the channel reservation preamble in the initial slot of the plurality of slots.

Aspect 18: The method of aspect 17, wherein a different UE that is outside of the subset of UEs is configured to transmit a second channel reservation preamble in a second slot that is after the initial slot of the plurality of slots, and the second channel reservation preamble includes a channel occupancy time that corresponds only to a duration of the second slot.

Aspect 19: The method of any of aspects 16 through 18, wherein the channel occupancy time is shared by all of the UEs of the set of UEs at a specific time.

Aspect 20: The method of any of aspects 16 through 19, wherein the channel occupancy time ends at a predetermined location of a resource pool configured for sidelink communications.

Aspect 21: A method for wireless communication at a UE, comprising: identifying a plurality of sub-bands of a shared radio frequency spectrum band for sidelink communications between UEs using a first radio access technology; determining, for each sub-band of the plurality of sub-bands, a start time for a channel reservation preamble associated with a second radio access technology, wherein the start time for each sub-band is determined relative to a boundary of a first symbol, and wherein different sub-bands have different start times; and transmitting the channel reservation preamble on one or more of the plurality of sub-bands based at least in part on the determined start time.

Aspect 22: The method of aspect 21, wherein a first instance of the channel reservation preamble is transmitted on a first sub-band starting at a first start time for the channel reservation preamble, and a second instance of the channel reservation preamble is transmitted on a second sub-band starting at a time offset relative to the first start time.

Aspect 23: The method of aspect 22, wherein the time offset of the second sub-band is common across a set of UEs that transmit and receive sidelink communications.

Aspect 24: The method of any of aspects 21 through 23, wherein the channel reservation preamble is transmitted on one sub-band of the plurality of sub-bands.

Aspect 25: The method of aspect 24, wherein the one sub-band of the plurality of sub-bands used to transmit the channel reservation preamble is selected randomly from the plurality of sub-bands.

Aspect 26: The method of any of aspects 24 through 25, wherein one or more other UEs transmits the channel reservation preamble on one or more other sub-bands of the plurality of sub-bands.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a UE, comprising a processor; memory coupled with the processor; and instructions stored in the memory and executable by the processor to cause the apparatus to perform a method of any of aspects 15 through 20.

Aspect 31: An apparatus for wireless communication at a UE, comprising at least one means for performing a method of any of aspects 15 through 20.

Aspect 32: A non-transitory computer-readable medium storing code for wireless communication at a UE, the code comprising instructions executable by a processor to perform a method of any of aspects 15 through 20.

Aspect 33: An apparatus for wireless communication at a UE, comprising a processor; memory coupled with the processor; and instructions stored in the memory and executable by the processor to cause the apparatus to perform a method of any of aspects 21 through 26.

Aspect 34: An apparatus for wireless communication at a UE, comprising at least one means for performing a method of any of aspects 21 through 26.

Aspect 35: A non-transitory computer-readable medium storing code for wireless communication at a UE, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first symbol of a sidelink communications frame of a first radio access technology that uses a shared radio frequency spectrum band for sidelink communications between UEs;
    determining a start time for a channel reservation preamble associated with a second radio access technology relative to the first symbol, wherein a duration of the channel reservation preamble is longer than a symbol duration of the first symbol of the sidelink communications frame, the duration of the channel reservation preamble being based at least in part on a subcarrier spacing used for the sidelink communications; and
    transmitting the channel reservation preamble based at least in part on the determined start time.

2. The method of claim 1, wherein the determining further comprises:
    determining the symbol duration of the first symbol from a plurality of available symbol durations of the first radio access technology; and
    determining the start time for the channel reservation preamble relative to the sidelink communications frame based at least in part on the symbol duration of the first symbol.

3. The method of claim 1, wherein the first radio access technology is a 5G new radio (NR) radio access technology and the second radio access technology is a Wi-Fi radio access technology based on IEEE 802.11 protocols or a dedicated short range communications (DSRC) radio access technology.

4. The method of claim 1, wherein the first symbol of the sidelink communications frame is an initial symbol of the sidelink communications frame and is used for automatic gain control (AGC) at a receiving UE, and a second symbol of the sidelink communications frame subsequent to the first symbol is used for sidelink data transmission, and wherein the start time for the channel reservation preamble is prior to the first symbol such that the duration of the channel reservation preamble ends prior to the second symbol of the sidelink communications frame.

5. The method of claim 4, wherein a gap symbol is configured prior to the first symbol of the sidelink communications frame and provides for switching of receiver hardware at the UE between transmission and reception configurations, and wherein the start time for the channel reservation preamble is during the gap symbol.

6. The method of claim 1, wherein the first symbol of the sidelink communications frame includes data transmission resources, and wherein the channel reservation preamble punctures the data transmission resources of the first symbol.

7. The method of claim 1, wherein the duration of the channel reservation preamble spans more than two symbol durations of the first radio access technology, and the start time for the channel reservation preamble is more than one symbol prior to the first symbol of the sidelink communications frame.

8. The method of claim 7, wherein the start time for the channel reservation preamble punctures a data transmission of a prior sidelink communications frame that is prior to the first symbol.

9. The method of claim 7, further comprising:
    receiving a sidelink configuration that provides for an early termination of sidelink communications in sidelink communications frames that occur prior to the channel reservation preamble.

10. The method of claim 7, further comprising:
    receiving a sidelink configuration that indicates a quantity of symbols for sidelink data transmissions in slots where the channel reservation preamble is to be transmitted, the quantity of symbols being based at least in part on a subcarrier spacing used for the sidelink communications.

11. The method of claim 1, wherein the duration of the channel reservation preamble spans an initial two symbols of the sidelink communications frame.

12. The method of claim 11, wherein:
    sidelink communications within the sidelink communications frame are rate-matched around the channel reservation preamble.

13. The method of claim 12, wherein the start time for the channel reservation preamble is prior to the first symbol of the sidelink communications frame.

14. The method of claim 1, wherein the first symbol of the sidelink communications frame is an automatic gain control (AGC) symbol, and wherein a transmission power associated with the channel reservation preamble is selected to be aligned with a subsequent sidelink transmission power.

15. A method for wireless communication at a user equipment (UE), comprising:
   identifying a first symbol of a sidelink communications frame of a first radio access technology that uses a shared radio frequency spectrum band for sidelink communications between a set of UEs, wherein the sidelink communications frame spans a plurality of slots and the first symbol is associated with an initial slot of the plurality of slots;
   determining a start time for a channel reservation preamble associated with a second radio access technology relative to the first symbol, wherein a duration of the channel reservation preamble is based at least in part on a subcarrier spacing used for the sidelink communications; and
   transmitting the channel reservation preamble in the first symbol based at least in part on the determined start time, wherein the channel reservation preamble indicates a channel occupancy time that is greater than one slot of the plurality of slots, the channel occupancy time being based at least in part on the subcarrier spacing used for the sidelink communications.

16. The method of claim 15, wherein the channel reservation preamble further includes an indication of a number of symbols of the sidelink communications frame are spanned by the channel reservation preamble.

17. The method of claim 16, wherein a subset of the set of UEs are configured to transmit the channel reservation preamble in the initial slot of the plurality of slots.

18. The method of claim 17, wherein a different UE that is outside of the subset of UEs is configured to transmit a second channel reservation preamble in a second slot that is after the initial slot of the plurality of slots, and wherein the second channel reservation preamble includes a channel occupancy time that corresponds only to a duration of the second slot.

19. The method of claim 16, wherein the channel occupancy time is shared by all of the UEs of the set of UEs at a specific time.

20. The method of claim 16, wherein the channel occupancy time ends at a predetermined location of a resource pool configured for sidelink communications.

21. A method for wireless communication at a user equipment (UE), comprising:
   identifying a plurality of sub-bands of a shared radio frequency spectrum band for sidelink communications between UEs using a first radio access technology;
   determining, for each sub-band of the plurality of sub-bands, a start time for a channel reservation preamble associated with a second radio access technology, a duration of the channel reservation preamble being based at least in part on a subcarrier spacing used for the sidelink communications, wherein the start time for each sub-band is determined relative to a boundary of a first symbol, and wherein different sub-bands have different start times; and
   transmitting the channel reservation preamble on one or more of the plurality of sub-bands based at least in part on the determined start time, wherein the channel reservation preamble indicates a channel reservation for a channel occupancy time, the channel occupancy time being based at least in part on the subcarrier spacing used for the sidelink communications.

22. The method of claim 21, wherein a first instance of the channel reservation preamble is transmitted on a first sub-band starting at a first start time for the channel reservation preamble, and a second instance of the channel reservation preamble is transmitted on a second sub-band starting at a time offset relative to the first start time.

23. The method of claim 22, wherein the time offset of the second sub-band is common across a set of UEs that transmit and receive sidelink communications.

24. The method of claim 21, wherein the channel reservation preamble is transmitted on one sub-band of the plurality of sub-bands.

25. The method of claim 24, wherein the one sub-band of the plurality of sub-bands used to transmit the channel reservation preamble is selected randomly from the plurality of sub-bands.

26. The method of claim 24, wherein one or more other UEs transmits the channel reservation preamble on one or more other sub-bands of the plurality of sub-bands.

27. An apparatus for wireless communication at a user equipment (UE), comprising:
   one or more processors,
   one or more memories coupled with the one or more processors; and
   instructions stored in the one or more memories and executable by the one or more processors to cause the apparatus to:
      identify a first symbol of a sidelink communications frame of a first radio access technology that uses a shared radio frequency spectrum band for sidelink communications between UEs;
      determine a start time for a channel reservation preamble associated with a second radio access technology relative to the first symbol, wherein a duration of the channel reservation preamble is longer than a symbol duration of the first symbol of the sidelink communications frame, the duration of the channel reservation preamble being based at least in part on a subcarrier spacing used for the sidelink communications; and
      transmit the channel reservation preamble based at least in part on the determined start time.

28. The apparatus of claim 27, wherein the instructions are further executable by the one or more processors to cause the apparatus to:
   determine the symbol duration of the first symbol from a plurality of available symbol durations of the first radio access technology; and
   determine the start time for the channel reservation preamble relative to the sidelink communications frame based at least in part on the symbol duration of the first symbol.

29. The apparatus of claim 27, wherein the first symbol of the sidelink communications frame is an initial symbol of the sidelink communications frame and is used for automatic gain control (AGC) at a receiving UE, and a second symbol of the sidelink communications frame subsequent to the first symbol is used for sidelink data transmission, and wherein the start time for the channel reservation preamble is prior to the first symbol such that the duration of the channel reservation preamble ends prior to the second symbol of the sidelink communications frame.

30. The apparatus of claim 29, wherein a gap symbol is configured prior to the first symbol of the sidelink communications frame and provides for switching of receiver hardware at the UE between transmission and reception configurations, and wherein the start time for the channel reservation preamble is during the gap symbol.

\* \* \* \* \*